(12) United States Patent
Takahashi et al.

(10) Patent No.: US 10,389,997 B2
(45) Date of Patent: *Aug. 20, 2019

(54) IMAGE PROCESSING APPARATUS AND IMAGE PROCESSING METHOD

(71) Applicant: Sony Corporation, Tokyo (JP)

(72) Inventors: Yoshitomo Takahashi, Kanagawa (JP); Shinobu Hattori, Tokyo (JP); Hironari Sakurai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,488

(22) Filed: Jun. 9, 2017

(65) Prior Publication Data

US 2017/0280127 A1     Sep. 28, 2017

Related U.S. Application Data

(63) Continuation of application No. 15/352,348, filed on Nov. 15, 2016, now Pat. No. 9,712,802, which is a
(Continued)

(30) Foreign Application Priority Data

Mar. 18, 2011  (JP) .................................. 2011-061486
Aug. 31, 2011  (JP) .................................. 2011-188815
Jan. 31, 2012  (JP) .................................. 2012-019024

(51) Int. Cl.
*H04N 19/597*     (2014.01)
*H04N 13/161*     (2018.01)
(Continued)

(52) U.S. Cl.
CPC ......... *H04N 13/161* (2018.05); *G06T 3/0093* (2013.01); *G06T 7/60* (2013.01);
(Continued)

(58) Field of Classification Search
CPC .. H04N 13/0048; H04N 19/44; H04N 19/597; H04N 19/70; H04N 13/0022;
(Continued)

(56) References Cited

U.S. PATENT DOCUMENTS 8,537,200 B2   9/2013  Zhang et al.
8,625,918 B2   1/2014  Takahashi et al.
(Continued)

FOREIGN PATENT DOCUMENTS

CN   101222639 A   7/2008
CN   101911700 A   12/2010
(Continued)

OTHER PUBLICATIONS

U.S. Appl. No. 13/178,609, filed Jul. 8, 2011, Takahashi et al.
(Continued)

*Primary Examiner* — Christopher S Kelley
*Assistant Examiner* — Kathleen M Walsh
(74) *Attorney, Agent, or Firm* — Wolf, Greenfield & Sacks, P.C.

(57) ABSTRACT

The present technique relates to an image processing apparatus and an image processing method capable of generating a color image of a display viewpoint using a color image and a depth image of a predetermined viewpoint. The viewpoint generation information generation unit generates viewpoint generation information used to generate a color image of a display viewpoint in accordance with a generation method of the color image of the display viewpoint obtained by performing warping processing using multi-viewpoint corrected color images and multi-viewpoint depth images. The multi-viewpoint image encoding unit encodes the multi-viewpoint corrected color images and the multi-viewpoint depth images, and transmits them with the viewpoint gen-
(Continued)

eration information. The present technique can be applied to, for example, a multi-viewpoint image processing apparatus.

15 Claims, 27 Drawing Sheets

Related U.S. Application Data continuation of application No. 14/003,941, filed as application No. PCT/JP2012/056084 on Mar. 9, 2012, now Pat. No. 9,615,079.

(51) Int. Cl.

| | | |
|---|---|---|
| *H04N 13/15* | (2018.01) | |
| *H04N 19/70* | (2014.01) | |
| *H04N 13/128* | (2018.01) | |
| *H04N 13/194* | (2018.01) | |
| *H04N 13/178* | (2018.01) | |
| *H04N 13/282* | (2018.01) | |
| *H04N 13/31* | (2018.01) | |
| *G06T 15/20* | (2011.01) | |
| *H04N 19/44* | (2014.01) | |
| *G06T 3/00* | (2006.01) | |
| *G06T 7/60* | (2017.01) | |
| *G06T 7/70* | (2017.01) | |
| *H04N 13/349* | (2018.01) | |
| *H04N 13/00* | (2018.01) | |

(52) U.S. Cl.
CPC .............. *G06T 7/70* (2017.01); *G06T 15/205* (2013.01); *H04N 13/128* (2018.05); *H04N 13/15* (2018.05); *H04N 13/178* (2018.05); *H04N 13/194* (2018.05); *H04N 13/282* (2018.05); *H04N 13/31* (2018.05); *H04N 13/349* (2018.05); *H04N 19/44* (2014.11); *H04N 19/597* (2014.11); *H04N 19/70* (2014.11); *H04N 2013/0077* (2013.01); *H04N 2013/0081* (2013.01)

(58) Field of Classification Search
CPC ........... H04N 13/0037; H04N 13/0059; H04N 13/0066; H04N 13/0282; H04N 13/0409; H04N 13/04; H04N 2013/0077; H04N 2013/0081; G06T 7/70; G06T 3/0093; G06T 7/60; G06T 15/205
USPC ........................................ 375/240.26; 348/43
See application file for complete search history.

(56) References Cited

U.S. PATENT DOCUMENTS

| | | | |
|---|---|---|---|
| 9,060,165 B2* | 6/2015 | Liu | ........................ H04N 13/00 |
| 9,491,462 B2 | 11/2016 | Takahashi et al. | |
| 9,560,375 B2 | 1/2017 | Takahashi et al. | |
| 9,615,079 B2* | 4/2017 | Takahashi | .............. G06T 15/205 |
| 9,648,344 B2 | 5/2017 | Takahashi et al. | |
| 9,712,802 B2* | 7/2017 | Takahashi | .............. G06T 15/205 |
| 9,788,008 B2 | 10/2017 | Takahashi et al. | |
| 9,900,595 B2 | 2/2018 | Takahashi | |
| 2010/0002948 A1 | 1/2010 | Gangwal et al. | |
| 2010/0296746 A1 | 11/2010 | Strom et al. | |
| 2010/0309286 A1 | 12/2010 | Chen et al. | |
| 2010/0329334 A1 | 12/2010 | Kim et al. | |
| 2011/0025829 A1 | 2/2011 | McNamer et al. | |
| 2011/0096832 A1 | 4/2011 | Zhang et al. | |
| 2011/0221861 A1 | 9/2011 | Jeon et al. | |
| 2011/0222602 A1 | 9/2011 | Sung et al. | |
| 2011/0242278 A1 | 10/2011 | Yang et al. | |
| 2011/0255592 A1* | 10/2011 | Sung | .................... H04N 19/597 375/240.02 |
| 2011/0274166 A1 | 11/2011 | Jeon et al. | |
| 2011/0279645 A1 | 11/2011 | Newton et al. | |
| 2011/0310982 A1 | 12/2011 | Yang et al. | |
| 2012/0014614 A1 | 1/2012 | Takahashi et al. | |
| 2013/0088570 A1 | 4/2013 | Takahashi et al. | |
| 2013/0147915 A1 | 6/2013 | Wiegand et al. | |
| 2013/0222534 A1 | 8/2013 | Rusanovskyy et al. | |
| 2013/0322543 A1 | 12/2013 | Sugio et al. | |
| 2013/0342647 A1* | 12/2013 | Takahashi | .............. G06T 15/205 348/43 |
| 2014/0002592 A1 | 1/2014 | Takahashi et al. | |
| 2014/0085418 A1 | 3/2014 | Takahashi et al. | |
| 2014/0104383 A1 | 4/2014 | Yoshitomo et al. | |
| 2014/0126641 A1 | 5/2014 | Takahashi et al. | |
| 2014/0126642 A1 | 5/2014 | Takahashi et al. | |
| 2014/0198847 A1 | 7/2014 | Takahashi | |
| 2014/0321546 A1 | 10/2014 | Sakurai et al. | |
| 2014/0341285 A1 | 11/2014 | Sakurai et al. | |
| 2016/0295228 A1 | 10/2016 | Takahashi et al. | |
| 2016/0295229 A1 | 10/2016 | Takahashi et al. | |
| 2016/0295230 A1 | 10/2016 | Takahashi et al. | |
| 2017/0041630 A1 | 2/2017 | Takahashi et al. | |
| 2017/0041631 A1 | 2/2017 | Takahashi et al. | |
| 2017/0064283 A1* | 3/2017 | Takahashi | .............. G06T 15/205 |
| 2017/0280128 A1* | 9/2017 | Takahashi | .............. G06T 15/205 |

FOREIGN PATENT DOCUMENTS

| | | | |
|---|---|---|---|
| CN | 101919259 A | 12/2010 | |
| CN | 101951525 A | 1/2011 | |
| EP | 2 360 930 A1 | 8/2011 | |
| EP | 2 387 243 A2 | 11/2011 | |
| EP | 2688280 A1 | 1/2014 | |
| JP | 2000-215311 A | 8/2000 | |
| JP | 2002-058031 A | 2/2002 | |
| JP | 2007-166381 A | 6/2007 | |
| JP | 2008-263528 A | 10/2008 | |
| JP | 2009-044722 A | 2/2009 | |
| JP | 2010-506287 A | 2/2010 | |
| JP | 2010-157825 A | 7/2010 | |
| JP | 2010-267231 A | 11/2010 | |
| JP | 2011-511597 A | 4/2011 | |
| JP | 2011-512067 A | 4/2011 | |
| WO | WO 2007/069487 A1 | 6/2007 | |
| WO | WO 2010/021666 A1 | 2/2010 | |
| WO | WO-2010050728 A2 * | 5/2010 | ........... H04N 19/597 |
| WO | WO 2010/071291 A1 | 6/2010 | |
| WO | WO 2010/071291 A1 * | 6/2010 | ......... H04N 13/0022 |
| WO | WO-2010071291 A1 * | 6/2010 | ........... H04N 13/128 |
| WO | WO 2010/079921 A2 | 7/2010 | |
| WO | WO 2010/084437 A2 | 7/2010 | |
| WO | WO 2010079921 A2 * | 7/2010 | ......... H04N 13/0003 |
| WO | WO-2010079921 A2 * | 7/2010 | ..... H04N 21/234327 |
| WO | WO 2010/092772 A1 | 8/2010 | |
| WO | WO 2010/107174 A2 | 9/2010 | |
| WO | 2010/141927 A1 | 12/2010 | |
| WO | WO 2011/013030 A1 | 2/2011 | |
| WO | WO 2011/046607 A2 | 4/2011 | |

OTHER PUBLICATIONS

U.S. Appl. No. 13/703,663, filed Dec. 12, 2012, Takahashi et al.
U.S. Appl. No. 14/003,941, filed Sep. 9, 2013, Takahashi et al.
U.S. Appl. No. 14/003,986, filed Sep. 9, 2013, Takahashi et al.
U.S. Appl. No. 14/116,400, filed Nov. 8, 2013, Takahashi et al.
U.S. Appl. No. 14/125,451, filed Dec. 11, 2013, Takahashi et al.
U.S. Appl. No. 14/128,055, filed Dec. 20, 2013, Takahashi et al.
U.S. Appl. No. 14/128,091, filed Dec. 20, 2013, Takahashi et al.
U.S. Appl. No. 14/239,581, filed Feb. 19, 2014, Takahashi.
U.S. Appl. No. 14/239,591, filed May 13, 2014, Sakurai et al.
U.S. Appl. No. 14/370,499, filed Jul. 3, 2014, Sakurai et al.
U.S. Appl. No. 15/177,065, filed Jun. 8, 2016, Takahashi et al.
U.S. Appl. No. 15/177,099, filed Jun. 8, 2016, Takahashi et al.
U.S. Appl. No. 15/177,122, filed Jun. 8, 2016, Takahashi et al.
U.S. Appl. No. 15/298,564, filed Oct. 20, 2016, Takahashi et al.

(56) References Cited

OTHER PUBLICATIONS

U.S. Appl. No. 15/298,632, filed Oct. 20, 2016, Takahashi et al.
U.S. Appl. No. 15/352,348, filed Nov. 15, 2016, Takahashi et al.
Chinese Office Action and English translation thereof dated Apr. 12, 2016 in connection with Chinese Application No. 201280012933.1.
Chinese Office Action and English translation thereof dated Sep. 2, 2016 in connection with Chinese Application No. 201280040938.5.
Extended European Search Report dated Aug. 7, 2014 in connection with Application No. 12760156.5.
Extended European Search Report dated Mar. 31, 2015 in connection with European Application No. 12828710.9.
International Search Report and Written Opinion and English translation thereof dated Nov. 27, 2012 in connection with International Application No. PCT/JP2012/071028.
International Search Report and Written Opinion and English translation thereof dated Nov. 13, 2012 in connection with Application No. PCT/JP2012/071030.
International Search Report and Written Opinion and English translation thereof dated May 29, 2012 in connection with International Application No. PCT/JP2012/056083.
International Search Report and Written Opinion and English translation thereof dated May 29, 2012 in connection with International Application No. PCT/JP2012/056084.
International Preliminary Report on Patentability and English translation thereof dated Mar. 13, 2014 in connection with International Application No. PCT/JP2012/071028.
International Preliminary Report on Patentability and English translation thereof dated Mar. 13, 2014 in connection with Application No. PCT/JP2012/071030.
International Preliminary Report on Patentability and English translation thereof dated Oct. 3, 2013 in connection with International Application No. PCT/JP2012/056083.
International Preliminary Report on Patentability and English translation thereof dated Oct. 3, 2013 in connection with International Application No. PCT/JP2012/056084.
Japanese Office Action and English translation thereof dated Feb. 23, 2016 in connection with Japanese Application No. 2013-531222.
Japanese Office Action and English translation thereof dated Apr. 12, 2016 in connection with Japanese Application No. 2013-505866.
[No Author Listed], "Call for Proposals on 3D Video Coding Technology", Int'l Organisation for Standarisation, Coding of Moving Pictures and Audio, ISO/IEC JTC1/SC29/WG11, Geneva, Switzerland, Mar. 2011, 20 pages.
[No Author Listed], Coding of moving pictures and audio. Draft Call for Proposals on 3D Video Coding Technology. ISO/IEC JTC1/SC29/WG11. Doc. N11679, Guangzhou, China, Oct. 2010.
[No Author Listed], International Organisation for Standardisation (Organisation Internationale De Normalisation) Iso/Iec Jtc1/Sc29/Wg11 Coding of Moving Pictures and Audio. Call for Proposals on 3D Video Coding Technology. Geneva, Switzerland. Mar. 2011. 20 pages.
Chen et al., Coding of moving pictures and audio. Response to Call for Evidence on Option-1 Video Coding Technology. ISO/IEC JTC1/SC29/WG11. MPEG2010/M18570. Guangzhou, China, Oct. 2010.
Oh et al., "Non-linear Bi-directional Prediction for Depth Coding", Advances in Multimedia Information Processing—PCM 2009, Springer Berlin Heidelberg, Dec. 15, 2009, p. 522-531.
Takahashi et al., International Organisation for Standardisation ISO/IEC JTC1/SC29/WG11, MPEG2011/M22566, Coding of Moving Pictures and Audio, Descriptions of 3D Video Coding Proposal (HEVC-Compatible Category), Geneva, Switzerland, Nov. 2011, 36 pages.
Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting: Geneva, CH Mar. 16-23, 2011, 206 pages.
Wiegand et al., WD3: Working draft 3 of high-efficiency video coding. Joint Collaborative Team on Video Coding (JCT-VC) of ITU-T SG16 WP3 and ISO/IEC JTC1/SC29/WG11. $5^{th}$ Meeting: Geneva, CH. Mar. 16-23, 2011. 205 pages.
Yea et al., RD-Optimized View Synthesis Prediction for Multiview Video Coding, Image Processing, ICIP 2007, IEEE, 4 pages.
Bourge et al., ISO/IEC CD 23002-3: Representation of auxiliary video and supplemenatl information. ISO/IEC JTC 1/SC 29 N7779, ISO/IEC JTC 1/SC 29/WG11 Information technology—MPEG video technologies—Part 3: Auxiliary video data representation. Dated Sep. 8, 2006. https://www.itscj.ipsj.or.jp/sc29/open/29view/29n7779c.htm.
Extended European Search Report dated Feb. 26, 2018 in connection with European Application No. 17181425.4.
Chinese Office Action and English translation thereof dated Sep. 4, 2018 in connection with Chinese Application No. 201710384783.1.
Chinese Office Action and English translation thereof dated Aug. 7, 2018 in connection with Chinese Application No. 201710384788.4.
Chinese Office Action and English translation thereof dated Sep. 4, 2018 in connection with Chinese Application No. 201710395370.3.
U.S. Appl. No. 16/028,394, filed Jul. 5, 2018, Takahashi et al.
Japanese Office Action dated Apr. 23, 2019 in connection with Japanese Application No. 2018-121576, and English translation thereof.

* cited by examiner

FIG. 1

| Multiview_acquisition_info(payloadSize) | C | Descriptor |
|---|---|---|
| num_views_minus1 | | ue(v) |
| intrinsic_param_flag | 5 | u(1) |
| extrinsic_param_flag | 5 | u(1) |
| if(intrinsic_param_flag){ | | |
| intrinsic_params_equal | 5 | u(1) |
| prec_focal_length | 5 | ue(v) |
| prec_principal_point | 5 | ue(v) |
| prec_skew_factor | 5 | ue(v) |

| | C | Descriptor |
|---|---|---|
| if(intrinsic_params_equal) | | |
| num_of_param_sets=1 | | |
| else | | |
| num_of_param_sets=num_views_minus1+1 | | |
| for(i=0; i<num_of_param_sets; i++){ | | |
| sign_focal_length_x[i] | 5 | u(1) |
| exponent_focal_length_x[i] | 5 | u(6) |
| mantissa_focal_length_x[i] | 5 | u(v) |
| sign_focal_length_y[i] | 5 | u(1) |
| exponent_focal_length_y[i] | 5 | u(6) |
| mantissa_focal_length_y[i] | 5 | u(v) |
| sign_principal_point_x[i] | 5 | u(1) |
| exponent_principal_point_x[i] | 5 | u(6) |
| mantissa_principal_point_x[i] | 5 | u(v) |
| sign_principal_point_y[i] | 5 | u(1) |
| exponent_principal_point_y[i] | 5 | u(6) |
| mantissa_principal_point_y[i] | 5 | u(v) |
| sign_skew_factor[i] | 5 | u(1) |
| exponent_skew_factor[i] | 5 | u(6) |
| mantissa_skew_factor[i] | 5 | u(v) |
| } | | |
| if(extrinsic_param_flag){ | | |
| prec_rotation_param | 5 | ue(v) |
| prec_translation_param | 5 | ue(v) |
| for(i=0; i<=num_views_minus1; i++) | | |
| for(j=1; j<=3; j++){ /*row*/ | | |
| for(k=1; k<=3; k++) { /*column*/ | | |
| sign_r[i][j][k] | 5 | u(1) |
| exponent_r[i][j][k] | 5 | u(6) |
| mantissa_r[i][j][k] | 5 | u(v) |
| } | | |
| sign_t[i][j] | 5 | u(1) |
| exponent_t[i][j] | 5 | u(6) |
| mantissa_t[i][j] | 5 | u(v) |
| } | | |
| } | | |

FIG. 4

| | |
|---|---|
| 1: | 3dv_view_synthesis_info(payloadSize) { |
| 2: | num_color_views_minus_1 |
| 3: | num_depth_views_minus_1 |
| 4: | for(i=0;i<num_color_views_minus_1;i++) { |
| 5: | color_view_id[i] |
| 6: | for(i=0;i<num_depth_views_minus_1;i++) { |
| 7: | depth_view_id[i] |
| 8: | intrinsic_param_flag |
| 9: | extrinsic_param_flag |
| 10: | if(intrinsic_param_flag) { |
| 11: | prec_focal_length |
| 12: | prec_principal_point |
| 13: | sign_focal_length_x |
| 14: | exponent_focal_length_x |
| 15: | mantissa_focal_length_x |
| 16: | for(i=0;i<num_depth_views_minus_1;i++) { |
| 17: | sign_principal_point_x[i] |
| 18: | exponent_principal_point_x[i] |
| 19: | mantissa_principal_point_x[i] |
| 20: | } |
| 21: | } |

| | |
|---|---|
| | if(extrinsic_param_flag) { |
| | prec_translation_param |
| | for(i=0;i<num_depth_views_minus_1;i++) { |
| | sign_translation_x[i] |
| | exponent_translation_x[i] |
| | mantissa_translation_x[i] |
| | } |
| | depth_map_flag |
| | if(depth_map_flag) { |
| | depth_nearest |
| | depth_farthest |
| | } |
| | else{ |
| | for(i=0;i<num_depth_views_minus_1;i++) { |
| | disparity_minimum[i] |
| | disparity_maximum[i] |
| | reference_depth_view[i] |
| | } |
| | } |

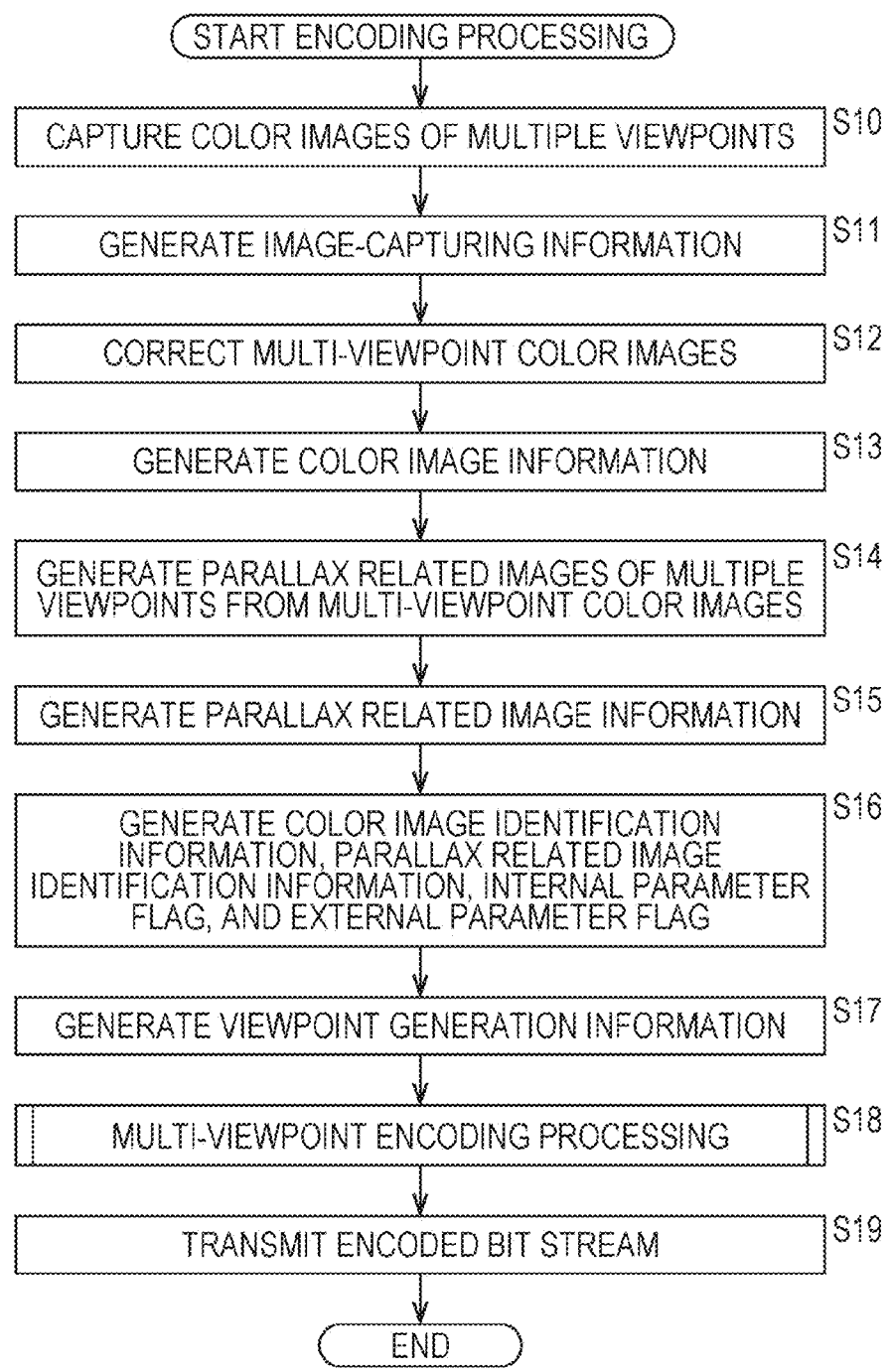

FIG. 17

```
pic_parameter_set_rbsp( ) {
        pic_parameter_set_id
        seq_parameter_set_id
        entropy_coding_mode_flag
        num_ref_idx_l0_default_active_minus1
        num_ref_idx_l1_default_active_minus1
        pic_init_qp_minus26   /* relative to 26 */
        constrained_intra_pred_flag
        disparity_precision
        disparity_pic_same_flag
        rbsp_trailing_bits( )
}
```

*FIG. 18*

```
slice_header( ) {
  first_tb_in_slice
  entropy_slice_flag
  if( !entropy_slice_flag ) {
    slice_type
    pic_parameter_set_id
    frame_num
    if( IdrPicFlag )
      idr_pic_id
    if( pic_order_cnt_type = = 0 )
      pic_order_cnt_lsb /*
    if( slice_type = = P || slice_type = = B ) {
      num_ref_idx_active_override_flag
      if( num_ref_idx_active_override_flag ) {
        num_ref_idx_l0_active_minus1
        if( slice_type = = B )
          num_ref_idx_l1_active_minus1
      }
    }
  }
  ref_pic_list_modification( )
  ref_pic_list_combination( )
  if( nal_ref_idc != 0 )
    dec_ref_pic_marking( )
  if( entropy_coding_mode_flag && slice_type != I)
    cabac_init_idc
    slice_qp_delta
  if( adaptive_loop_filter_enabled_flag )
    alf_param()
```

FIG. 19

```
if( deblocking_filter_control_present_flag ) {
    disable_deblocking_filter_idc
    if( disable_deblocking_filter_idc != 1 ) {
      slice_alpha_c0_offset_div2
       slice_beta_offset_div2
    }
  }
if( ! disparity_pic_same_flag ){
      if ( slice_type == I ){
        minimum_disparity
        maximum_disparity
        translation_x
     }else{
        delta_minimum_disparity
        delta_maximum_disparity
        delta_translation_x
     }
   }
} else
   if( entropy_coding_mode_flag  && slice_type != I)
     cabac_init_idc
}
```

IMAGE PROCESSING APPARATUS AND IMAGE PROCESSING METHOD

CROSS REFERENCE TO RELATED APPLICATIONS

This application is a continuation of and claims the benefit under 35 U.S.C. § 120 of U.S. patent application Ser. No. 15/352,348, titled "IMAGE PROCESSING APPARATUS AND IMAGE PROCESSING METHOD," filed on Nov. 15, 2016, which claims the benefit under 35 U.S.C. § 120 of U.S. patent application Ser. No. 14/003,941, now U.S. Pat. No. 9,615,079, titled "IMAGE PROCESSING APPARATUS AND IMAGE PROCESSING METHOD," filed on Sep. 9, 2013, which is the National Stage of International Application No. PCT/JP2012/056084, filed in the Japanese Patent Office as a Receiving Office on Mar. 9, 2012, titled "IMAGE PROCESSING DEVICE AND IMAGE PROCESSING METHOD," which claims the priority benefit of Japanese Patent Application Numbers 2011-061486, filed in the Japanese Patent Office on Mar. 18, 2011; 2011-188815, filed in the Japanese Patent Office on Aug. 31, 2011; and 2012-019024, filed in the Japanese Patent Office on Jan. 31, 2012, each titled "IMAGE PROCESSING DEVICE AND IMAGE PROCESSING METHOD." Each of these applications is hereby incorporated by reference in its entirety.

TECHNICAL FIELD

The present technique relates to an image processing apparatus and an image processing method, and more particularly, to an image processing apparatus and an image processing method capable of generating a color image of a display viewpoint using a color image and a depth image of a predetermined viewpoint.

BACKGROUND ART

In recent years, 3D images attract attention. A generally used method for viewing a 3D image is such that a person wears glasses that open the left eye shutter during displaying of one of images of two viewpoints and that open the right eye shutter during displaying of the other of the images, and the person views the images of the two viewpoints which are displayed alternately (hereinafter referred to as "method using glasses").

However, with such method using glasses, it is necessary for a viewer to purchase the glasses in addition to a 3D image display device, which reduces the appetite for purchase. Moreover, the viewer has to wear glasses during viewing, which is troublesome. Therefore, the demand for a viewing method for viewing 3D images without wearing glasses (hereinafter referred to as "method without glasses").

In the method without glasses, images of three or more viewpoints are displayed in such a manner that the viewable angle is different for each viewpoint, and when the viewer sees images of two viewpoints with the right and left eyes, the viewer can see a 3D image without wearing glasses.

The following method has been made as a display method of 3D image according to the method without glasses. In this method, a color image and a depth image of a predetermined viewpoint are obtained, and using the color image and the depth image, color images of multiple viewpoints which are display viewpoints including viewpoints other than the predetermined viewpoint are generated and displayed. It should be noted that "multiple viewpoints" mean three or more viewpoints.

As a method for encoding color images of multiple viewpoints and a depth image, a method for separately encoding the color images and the depth image has been suggested (for example, see Patent Document 1).

CITATION LIST

Non-Patent Document

Non-Patent Document 1: INTERNATIONAL ORGANIZATION FOR STANDARDIZATION ORGANIZATION INTERNATIONALE DE NORMALIZATION ISO/IEC JTC1/SC29/WG11 CODING OF MOVING PICTURES AND AUDIO, Guangzhou, China, October 2010

SUMMARY OF THE INVENTION

Problems to be Solved by the Invention

In conventional encoding standard and the like, transmission of information suitable for displaying of 3D image according to the method without glasses is not taken into consideration. Therefore, in the conventional encoding standard, a large amount of information is transmitted, which is not necessary for generation of color images of multiple viewpoints which are display viewpoints including viewpoints other than the predetermined viewpoint using a color image of a predetermined viewpoint and a parallax related image which is an image (depth image) related to parallax such as a depth image, and moreover, necessary information is transmitted.

As a result, a reception side cannot generate a color image of a viewpoint other than the viewpoint using the color image of the predetermined viewpoint and the parallax related image.

The present technique is made in view of such circumstances, and is to allow generation of a color image of a display viewpoint using a color image of a predetermined viewpoint and a parallax related image.

Solutions to Problems

An image processing apparatus according to a first aspect of the present technique is an image processing apparatus including an encoding unit for generating a bit stream by encoding a color image of a viewpoint and a depth image of the viewpoint; a generation unit for generating viewpoint generation information used to generate a color image of a display viewpoint, in accordance with a generation method of the color image of the display viewpoint obtained by performing warping processing using the color image and the depth image; a transmission unit for transmitting the bit stream generated by the encoding unit and the viewpoint generation information generated by the generation unit.

An image processing method according to a first aspect of the present technique corresponds to the image processing apparatus according to the first aspect of the present technique.

In the first aspect of the present technique, a bit stream is generated by encoding a color image of a viewpoint and a depth image of the viewpoint, and viewpoint generation information is generated that is used to generate a color image of a display viewpoint, in accordance with a generation method of the color image of the display viewpoint obtained by performing warping processing using the color image and the depth image, and the bit stream and the viewpoint generation information are transmitted.

An image processing apparatus according to a second aspect of the present technique is an image processing apparatus including a receiving unit for receiving a bit stream obtained as a result of encoding of a color image of a viewpoint and a depth image of the viewpoint and viewpoint generation information used to generate a color image of a display viewpoint which is generated in accordance with a generation method of the color image of the display viewpoint obtained by performing warping processing using the color image and the depth image, a decoding unit for generating the color image and the depth image by decoding the bit stream received by the receiving unit, and a generation unit for generating the color image of the display viewpoint by performing warping processing using the color image and the depth image generated by the decoding unit and the viewpoint generation information received by the receiving unit.

An image processing method according to a second aspect of the present technique corresponds to the image processing apparatus according to the second aspect of the present technique.

In the second aspect of the present technique, a bit stream obtained as a result of encoding of a color image of a viewpoint and a depth image of the viewpoint and viewpoint generation information used to generate a color image of a display viewpoint which is generated in accordance with a generation method of the color image of the display viewpoint obtained by performing warping processing using the color image and the depth image are received, and the color image and the depth image are generated by decoding the bit stream received in the processing of the receiving step, and the color image of the display viewpoint is generated by performing warping processing using the color image and the depth image and the viewpoint generation information.

An image processing apparatus according to the first and second aspects can be achieved by causing a computer to execute a program.

In order to achieve the image processing apparatus according to the first and second aspects, a program executed by the computer can be provided by transmitting the program via a transmission medium or recording the program to a recording medium.

Effects of the Invention

According to the first aspect of the present technique, necessary information for generation of a color image of a display viewpoint using a color image of a predetermined viewpoint and a depth image can be transmitted.

According to the second aspect of the present technique, a color image of a display viewpoint can be generated using a color image of a predetermined viewpoint and a depth image.

BRIEF DESCRIPTION OF DRAWINGS

FIG. 1 is a figure illustrating syntax of Multiview acquisition information SEI.

FIG. 4 is a figure illustrating an example of description of a portion of SEI.

FIG. 5 is a flowchart explaining encoding processing of the encoding device of FIG. 2.

FIG. 17 is a figure illustrating an example of syntax of PPS of FIG. 16.

FIG. 18 is a figure illustrating an example of syntax of a slice header.

FIG. 19 is a figure illustrating an example of syntax of a slice header.

MODE FOR CARRYING OUT THE INVENTION

<Explanation About Depth Image (Parallax Related Image) in this Specification>

Figure 25:
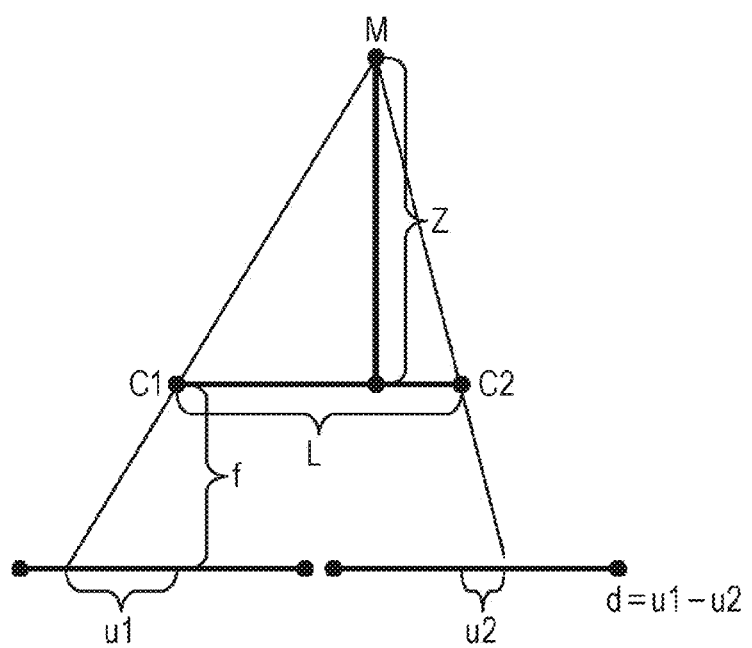
FIG. 25 is a figure explaining parallax and depth.

FIG. 25 is a figure explaining parallax and depth.

As illustrated in FIG. 25, when a color image of a subject M is captured by a camera c1 provided at a position C1 and a camera c2 provided at a position C2, a depth Z of the subject M which is a distance in a depth direction from the camera c1 (camera c2) is defined by the following expression (a).

$$Z = (L/d) \times f \quad \text{(a)}$$

It should be noted that L denotes a distance between the position C1 and the position C2 in a horizontal direction (hereinafter referred to as inter-camera distance). Variable d denotes a value obtained by subtracting a distance u2 of the position of the subject M on the color image captured by the camera c2 in the horizontal direction from the center of the color image from a distance u1 of the position of the subject M on the color image captured by the camera c1 in the horizontal direction from the center of the color image. More specifically, d denotes parallax. Further, f denotes the focal distance of the camera c1. In the expression (a), the focal distances of the camera c1 and the camera c2 are the same.

As shown in the expression (a), the parallax d and the depth Z can be converted uniquely. Therefore, in this specification, the parallax image representing the parallax d of the color images of two viewpoints taken by the camera c1 and the camera c2 and the depth image representing the depth Z are collectively referred to as a depth image (parallax related image).

It should be noted that the depth image (parallax related image) may be an image representing the parallax d or the depth Z, and the pixel value of the depth image (parallax related image) may not be the parallax d or depth Z itself. For example, a value obtained by normalizing the parallax d or a value obtained by normalizing a reciprocal number 1/Z of the depth Z may be employed.

A value I obtained by normalizing the parallax d with 8 bits (0 to 255) can be obtained from the following expression (b). The number of normalization bits of the parallax d is not limited to eight bits. It may be other bit numbers such as 10 bits and 12 bits.

[Mathematical Formula 4]

$$I = \frac{255 \times (d - D_{min})}{D_{max} - D_{min}} \quad \text{(b)}$$

In the expression (b), $D_{max}$ is the maximum value of the parallax d, $D_{min}$ is the minimum value of the parallax d. The maximum value $D_{max}$ and the minimum value $D_{min}$ may be set in unit of screen, or may be set in units of multiple screens.

A value y obtained by normalizing the reciprocal number 1/Z of the depth Z with 8 bits (0 to 255) can be obtained from the following expression (c). The number of normalization bits of the reciprocal number 1/Z of the depth Z is not limited to 8 bits. It may be other bit numbers such as 10 bits and 12 bits.

[Mathematical Formula 5]

$$y = 255 \times \frac{\frac{1}{Z} - \frac{1}{Z_{far}}}{\frac{1}{Z_{near}} - \frac{1}{Z_{far}}} \quad \text{(c)}$$

In the expression (c), $Z_{far}$ denotes the maximum value of the depth Z, and $Z_{near}$ denotes the minimum value of the depth Z. The maximum value $Z_{far}$ and the minimum value $Z_{near}$ may be set in unit of screen, or may be set in units of multiple screens.

As described above, in this specification, since the parallax d and the depth Z can be converted uniquely, the parallax image in which the value I obtained by normalizing the parallax d is the pixel value and the depth image in which the value y obtained by normalizing the reciprocal number 1/Z of the depth Z is the pixel value are collectively referred to as the depth image (parallax related image). In this case, the color format of the depth image (parallax related image) is either YUV420 or YUV400, but may be other color formats.

When the value I or the value y is not used as the pixel value of the depth image (parallax related image) and attention is given to the information of the value I or the value y itself, the value I or the value y is adopted as depth information. Further, what is obtained by mapping the value I or the value y will be referred to as a depth map.

First Embodiment

[Example of Configuration of First Embodiment of Encoding Device]

Figure 2:
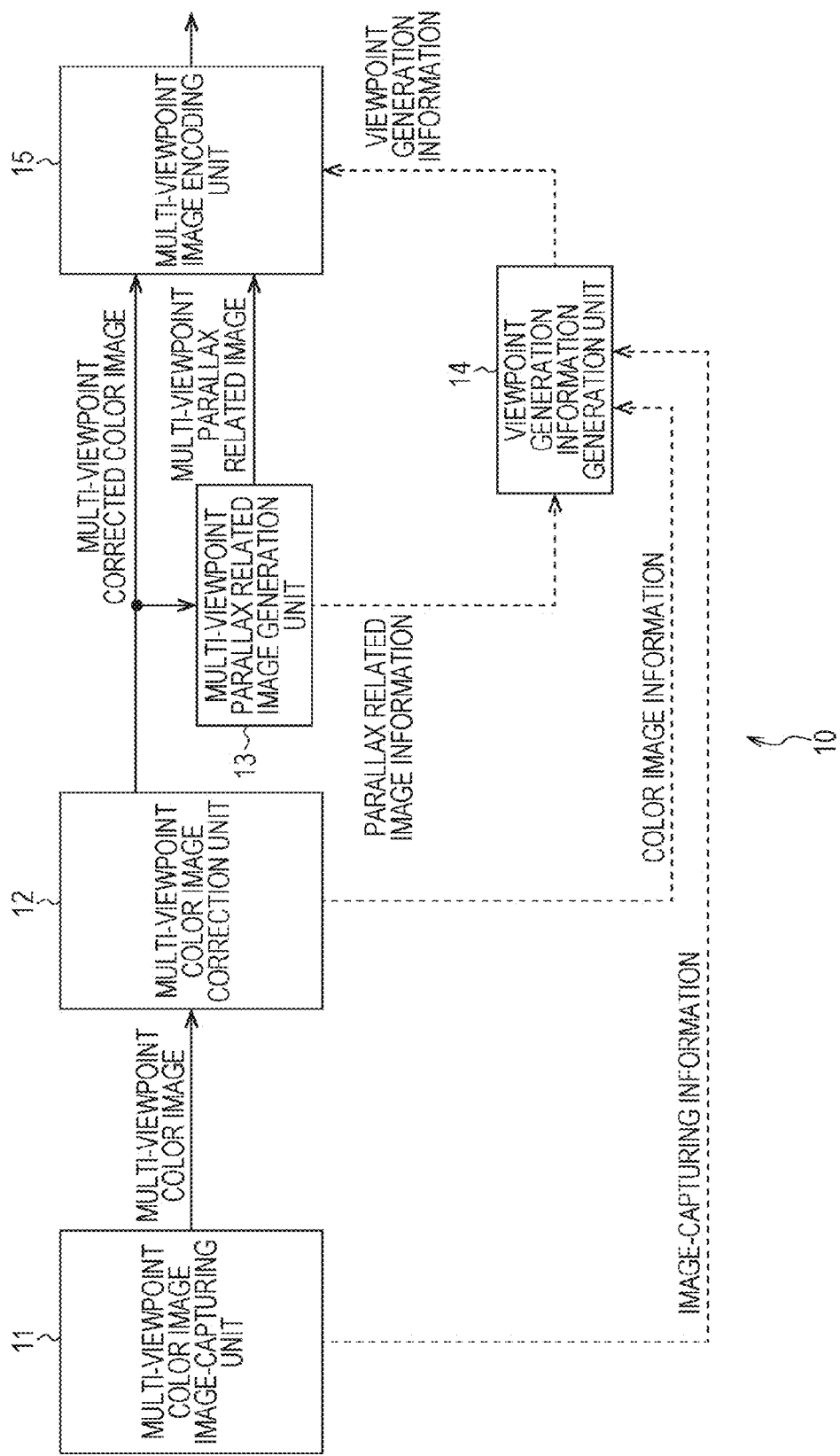
FIG. 2 is a block diagram illustrating an example of configuration of a first embodiment of an encoding device serving as an image processing apparatus to which the present technique is applied.

FIG. 2 is a block diagram illustrating an example of configuration of a first embodiment of an encoding device serving as an image processing apparatus to which the present technique is applied.

An encoding device 10 of FIG. 2 includes a multi-viewpoint color image image-capturing unit 11, a multi-viewpoint color image correction unit 12, a multi-viewpoint parallax related image generation unit 13, a viewpoint generation information generation unit 14, and a multi-viewpoint image encoding unit 15.

The encoding device 10 encodes a color image of a predetermined viewpoint and a parallax related image, and uses the color image of the predetermined viewpoint and the parallax related image to add and transmit viewpoint generation information which is information for generating a color image of a viewpoint other than the predetermined viewpoint.

The multi-viewpoint color image image-capturing unit 11 of the encoding device 10 captures color images of multiple viewpoints, and provides them as multi-viewpoint color images to the multi-viewpoint color image correction unit 12. The multi-viewpoint color image image-capturing unit 11 generates, as image-capturing information, information about image-capturing such as the number of viewpoints of the color images, external parameters, and range information, and provides the information to the viewpoint generation information generation unit 14.

It should be noted that the external parameter is a parameter for defining the position of multi-viewpoint color image image-capturing unit 11 in the horizontal direction.

When the parallax related image generated by the multi-viewpoint parallax related image generation unit 13 is a depth image, the range information includes the minimum value (minimum value $Z_{near}$) and the maximum value (maximum value $Z_{far}$) of world coordinate values at positions in the depth direction that would occur in the multi-viewpoint parallax related image (multi-viewpoint depth image). The minimum value and the maximum value will be hereinafter referred to as a depth minimum value and a depth maximum value, respectively. On the other hand, when the parallax related image generated by the multi-viewpoint parallax related image generation unit 13 is a parallax image, the range information includes the minimum value (minimum value $D_{min}$) and the maximum value (maximum value $D_{max}$) of parallax on the world coordinate that would occur in the multi-viewpoint parallax related image, and also information for identifying a color image of a viewpoint adopted as a base point when a parallax value is obtained. The minimum value and the maximum value will be hereinafter referred to as a parallax minimum value and a parallax maximum value, respectively.

The multi-viewpoint color image correction unit 12 performs color correction, brightness correction, distortion correction, and the like on the multi-viewpoint color images provided from the multi-viewpoint color image image-capturing unit 11. Accordingly, the focal distance of the multi-viewpoint color image image-capturing unit 11 in the corrected multi-viewpoint color image in the horizontal direction (X direction) is the same at all the viewpoints. The multi-viewpoint color image correction unit 12 provides the corrected multi-viewpoint color image to the multi-viewpoint parallax related image generation unit 13 and the multi-viewpoint image encoding unit 15 as multi-viewpoint corrected color images. The multi-viewpoint color image correction unit 12 generates information about the multi-viewpoint corrected color image such as internal parameters as color image information, and provides the information to the viewpoint generation information generation unit 14.

The internal parameters include the focal distance, in the horizontal direction, of the multi-viewpoint color image image-capturing unit 11 which is the same for all the viewpoints in the multi-viewpoint corrected color images, and the principal point which is the center of the image, i.e., the position of the optical center of the lens in the horizontal direction. The position of the principal point in the horizontal direction may be different for each viewpoint.

The multi-viewpoint parallax related image generation unit 13 generates parallax related images of multiple viewpoints from the multi-viewpoint corrected color images provided from the multi-viewpoint color image correction unit 12. Then, the multi-viewpoint parallax related image generation unit 13 provides the generated parallax related images of multiple viewpoints to the multi-viewpoint image encoding unit 15 as the multi-viewpoint parallax related image.

The multi-viewpoint parallax related image generation unit 13 generates, as parallax related image information (depth image information), information about the multi-viewpoint parallax related image such as the number of viewpoints of the multi-viewpoint parallax related images, image type information indicating whether the multi-viewpoint parallax related image is a depth image or a parallax image (depth image identification information). Then, the multi-viewpoint parallax related image generation unit 13 provides the parallax related image information to the viewpoint generation information generation unit 14.

The viewpoint generation information generation unit 14 functions as a generation unit, and uses the multi-viewpoint corrected color image and the multi-viewpoint parallax related image to generate viewpoint generation information in accordance with a predetermined method for generating a color image of another viewpoint. More specifically, the viewpoint generation information generation unit 14 generates the color image identification information and the parallax related image identification information (depth image identification information) on the basis of the number of viewpoints of the color images provided from the multi-viewpoint color image image-capturing unit 11 and the number of viewpoints of the parallax related images provided from the multi-viewpoint parallax related image generation unit 13. It should be noted that the color image identification information is information for identifying the color image, and the parallax related image identification information is information for identifying the parallax related image.

The viewpoint generation information generation unit 14 generates an external parameter flag indicating presence/absence of an external parameter at each viewpoint corresponding to the multi-viewpoint parallax related image on the basis of the external parameter included in the image-capturing information provided by the multi-viewpoint color image image-capturing unit 11. Further, the viewpoint generation information generation unit 14 generates an internal parameter flag indicating presence/absence of an internal parameter at each viewpoint corresponding to the multi-viewpoint parallax related image on the basis of the internal parameter included in the color image information provided by the multi-viewpoint color image correction unit 12. Then, the viewpoint generation information generation unit 14 generates viewpoint generation information from the color image identification information, the parallax related image identification information, the external parameter flag, the internal parameter flag, the image-capturing information, the color image information, and the parallax related image information. The viewpoint generation information is constituted by the color image identification information, the parallax related image identification information, the external parameter information, the internal parameter information, the number of viewpoints of the color images, the range information, the number of viewpoints of the parallax related images, and the image type information. It should be noted that the external parameter information is constituted by the external parameter flag and the external parameter of the viewpoint corresponding to the multi-viewpoint parallax related image, and the internal parameter information is constituted by the internal parameter flag and the internal parameter of the viewpoint corresponding to the multi-viewpoint parallax related image. The viewpoint generation information generation unit 14 provides the generated viewpoint generation information to the multi-viewpoint image encoding unit 15.

The multi-viewpoint image encoding unit 15 functions as an encoding unit, and encodes the multi-viewpoint corrected color image provided by the multi-viewpoint color image correction unit 12 and the multi-viewpoint parallax related image provided by the multi-viewpoint parallax related image generation unit 13 in accordance with the same method as MVC (Multiview Video Coding) method, and adds the viewpoint generation information provided by the viewpoint generation information generation unit 14. The multi-viewpoint image encoding unit 15 functions as a transmission unit, and transmits, as an encoded bit stream, the bit stream obtained as a result.

[Example of Configuration of Encoded Bit Stream]

Figure 3:
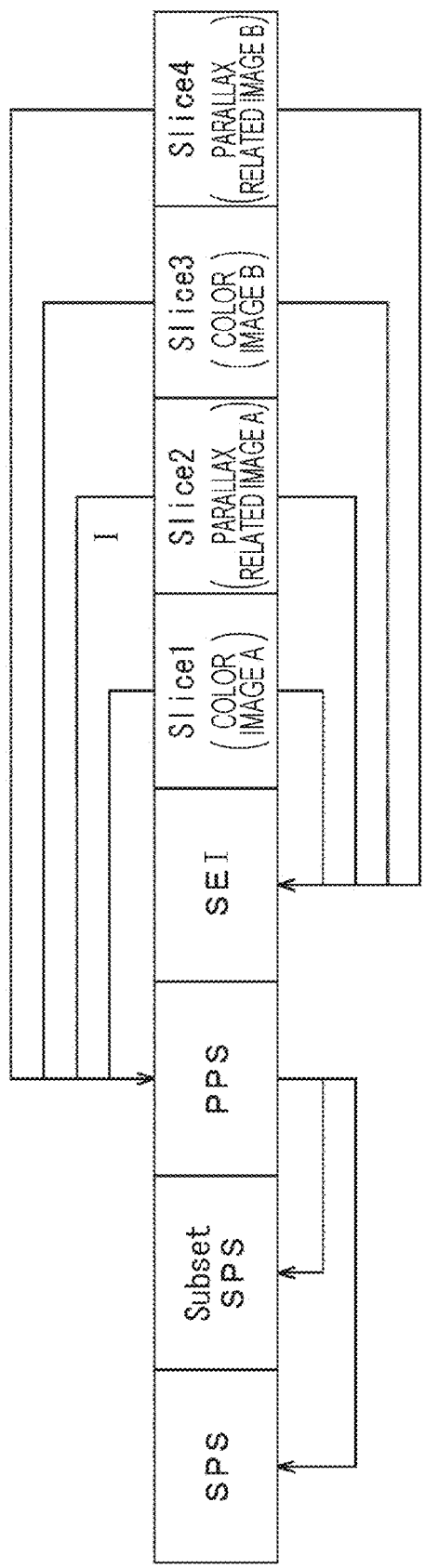
FIG. 3 is a figure illustrating an example of configuration of an access unit of an encoded bit stream.

FIG. 3 is a figure illustrating an example of configuration of an access unit of an encoded bit stream generated by the encoding device 10 of FIG. 2.

As illustrated in FIG. 3, the access unit of the encoded bit stream is constituted by SPS (Sequence Parameter Set), Subset SPS, PPS (Picture Parameter Set), SEI, and slice.

In the example of FIG. 3, the number of viewpoints of the multi-viewpoint corrected color images and the multi-viewpoint parallax related images is two. The corrected color image A which is one of viewpoints of the multi-viewpoint corrected color images of the two viewpoints is encoded as a base view. The corrected color image B of the other of the viewpoints, the parallax related image A corresponding to the color image A, and the parallax related image B corresponding to the color image B are encoded as non-base views.

As a result, the slices are arranged, for example, in the following order: a slice for the color image A encoded as the base view, a slice of the parallax related image A encoded as the non-base view, and a slice for the color image B, and then a slice for the parallax related image B. In the header portion of each slice, information for identifying PPS is described.

SPS is a header including information about encoding of the base view. Subset SPS is an extension header including information about encoding of the base view and the non-base view. PPS is a header including information indicating encoding mode of the entire picture and information for identifying SPS and Subset SPS. SEI is additional information which is not requisite for decoding, and includes viewpoint generation information and the like.

During decoding of the color image A which is encoded as the base view, PPS is looked up on the basis of information for identifying PPS described in the header portion of the color image A, and SPS is looked up on the basis of information for identifying SPS described in PPS.

On the other hand, during decoding of the parallax related image A encoded as the non-base view, PPS is looked up on the basis of information for identifying PPS described in the header of the parallax related image A. Sub SPS is looked up on the basis of information for identifying Sub SPS described in PPS. During decoding of the color image B and the parallax related image B encoded as the non-base view, PPS is also looked up and Sub SPS is also looked up just like during decoding of the parallax related image A.

[Example of a Portion of Description of SEI]

FIG. 4 is a figure illustrating an example of description of a portion of SEI.

In the second line from the top at the left side of SEI of FIG. 4, the number of viewpoints (num_color_view_minus_1) of the color image is described. In the third line, the number of viewpoints (num_depth_view_minus_1) of the parallax related image is described.

In the fifth line from the top at the left side of FIG. 4, the view ID (color_view_id) of the color image is described as the color image identification information of the color image of each viewpoint. In the seventh line, the view ID (depth_view_id) of the parallax related image is described as the parallax related image identification information of the parallax related image of each viewpoint. In the eighth line from the top at the left side of FIG. 4, the internal parameter flag in the internal parameter information is described for each viewpoint corresponding to the multi-viewpoint parallax related image. In the ninth line, the external parameter flag in the external parameter information is described for each viewpoint corresponding to the multi-viewpoint parallax related image.

In the 11th and 13th to 15th lines from the top at the left side of FIG. 4, the focal distance in the horizontal direction in the internal parameter is described.

In SEI of FIG. 4, real number x is described as a floating point number using prec value, sign value, exponent value, and a mantissa value defined by the following expression (1).

When $e=0$ holds, $v = \text{Max}(0, \text{prec}-30)$ $x = (-1)^s \cdot 2^{-(30+v)} \cdot n$ When $0 < e \leq 62$ holds, $v = \text{Max}(0, e+\text{prec}-31)$ $$x = (-1)^s \cdot 2^{e-31} \cdot (1 + n/2^v) \qquad (1)$$

In the expression (1), prec denotes prec value, s denotes sign value, e denotes exponent value, and n denotes mantissa value. Accordingly, sign value, exponent value, mantissa value represent sign, exponent, mantissa of the real number x, respectively.

As described above, the real number x is described as a floating point number, and therefore, in the 11th and 13th to 15th lines from the top at the left side of FIG. 4, prec value (prec_focal_length), sign value (sign_focal_length_x), exponent value (exponent_focal_length_x), mantissa value (mantissa_focal_length_x) of the focal distance in the horizontal distance are described, respectively.

In the 12th line from the top at the left side of FIG. 4, a value common to each viewpoint corresponding to the multi-viewpoint parallax related image is described as prec value (prec_principal_point) at the position of the principal point in the horizontal direction. In the 17th to 19th lines from the top at the left side of FIG. 4, sign value (sign_principal_point_x), exponent value (exponent_principal_point_x), mantissa value (mantissa_principal_point_x) at the position of principal point in the horizontal direction are described for each viewpoint corresponding to the multi-viewpoint parallax related image.

In the 2nd line from the top at the right side of FIG. 4, a value common to each viewpoint corresponding to the multi-viewpoint parallax related image is described as prec value (prec_translation_param) of the external parameter. In the 4th to 6th lines from the top at the right side of FIG. 4, external parameters of sign value (sign_translation_x), exponent value (exponent_translation_x), mantissa value (mantissa_translation_x) are described for each viewpoint corresponding to the multi-viewpoint parallax related image.

In the 9th lines from the top at the right side of FIG. 4, image type information (depth_map_flag) is described. In the 11th to 12th lines from the top at the right side of FIG. 4, when the image type information indicates the depth image, the depth minimum value (depth_nearest) and the depth maximum value (depth_farthest) which are common to each viewpoint corresponding to the multi-viewpoint parallax related image in the range information are described.

Further, in the 16th to 18th lines from the top at the right side of FIG. 4, range information where the image type information indicates the parallax image is described. More specifically, in 16th and 17th lines, the parallax minimum value (disparity_minimum) and the parallax maximum value (disparity_maximum) are described, respectively. The parallax minimum value and the parallax maximum value are different according to the viewpoint, and therefore, they are generated and described for each viewpoint.

In the 18th line, the view ID (reference_depth_view) of the color image is described, for each viewpoint corresponding to the multi-viewpoint parallax related image, as information for identifying the color image of the viewpoint adopted as the base point when the parallax value is derived.

[Explanation About Processing of Encoding Device]

FIG. 5 is a flowchart explaining encoding processing of the encoding device 10 of FIG. 2.

In step S10 in FIG. 5, the multi-viewpoint color image image-capturing unit 11 of the encoding device 10 captures color images of multiple viewpoints, and provides them as multi-viewpoint color images to the multi-viewpoint color image correction unit 12.

In step S11, the multi-viewpoint color image image-capturing unit 11 generates image-capturing information, and provides it to the viewpoint generation information generation unit 14.

In step S12, the multi-viewpoint color image correction unit 12 performs color correction, brightness correction, distortion correction, and the like on the multi-viewpoint color images provided from the multi-viewpoint color image image-capturing unit 11. The multi-viewpoint color image correction unit 12 provides the corrected multi-viewpoint color image to the multi-viewpoint parallax related image generation unit 13 and the multi-viewpoint image encoding unit 15 as multi-viewpoint corrected color images.

In step S13, the multi-viewpoint color image correction unit 12 generates color image information, and provides it to the viewpoint generation information generation unit 14.

In step S14, the multi-viewpoint parallax related image generation unit 13 generates parallax related images of multiple viewpoints from the multi-viewpoint corrected color images provided from the multi-viewpoint color image correction unit 12. Then, the multi-viewpoint parallax related image generation unit 13 provides the generated parallax related images of multiple viewpoints to the multi-viewpoint image encoding unit 15 as the multi-viewpoint parallax related image.

In step S15, the multi-viewpoint parallax related image generation unit 13 generates parallax related image information, and provides it to the viewpoint generation information generation unit 14.

In step S16, the viewpoint generation information generation unit 14 generates color image identification information, parallax related image identification information, internal parameter flag, and external parameter flag on the basis of the image-capturing information, the color image information, and the parallax related image information.

In step S17, the viewpoint generation information generation unit 14 generates viewpoint generation information. More specifically, the viewpoint generation information generation unit 14 generates, as the viewpoint generation information, color image identification information, parallax related image identification information, the number of viewpoints of color images, external parameter information, internal parameter information, range information, the number of viewpoints of parallax related images, and image type information. The viewpoint generation information generation unit 14 provides the generated viewpoint generation information to the multi-viewpoint image encoding unit 15.

In step S18, the multi-viewpoint image encoding unit 15 performs multi-viewpoint encoding processing for encoding the multi-viewpoint corrected color image and the multi-viewpoint parallax related image, and adding the viewpoint generation information and the like. The details of the multi-viewpoint encoding processing will be explained with reference to FIG. 6 explained later.

In step S19, the multi-viewpoint image encoding unit 15 transmits the encoded bit stream generated as a result of step S18, and terminates the processing.

Figure 6:
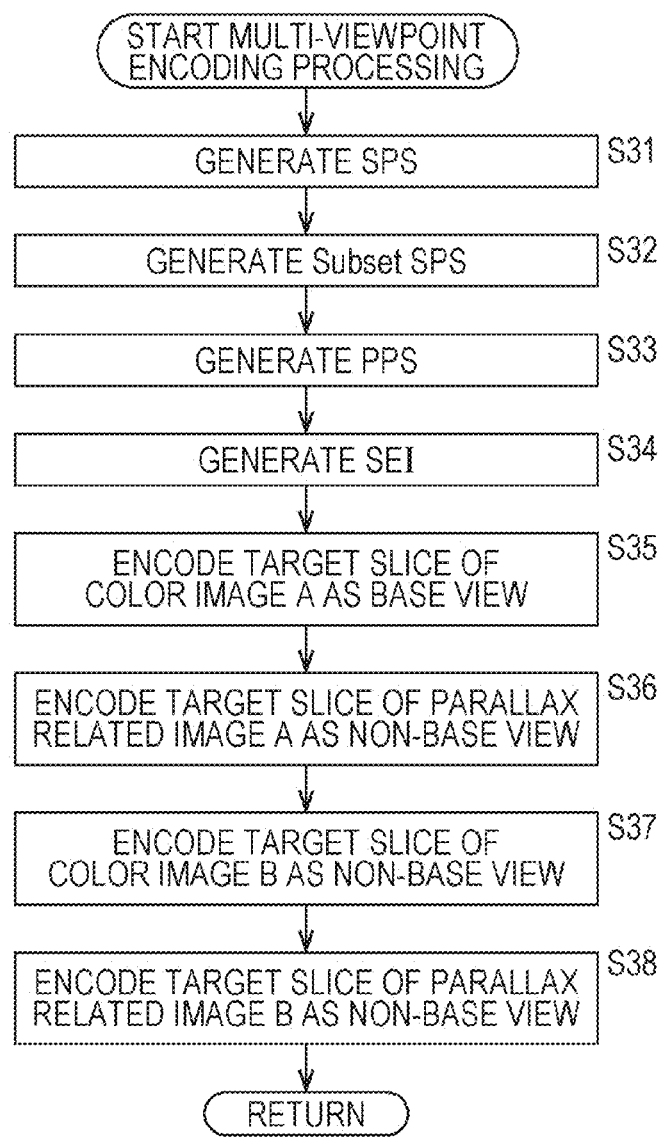
FIG. 6 is a flowchart explaining the details of multi-viewpoint encoding processing of FIG. 5.

FIG. 6 is a flowchart explaining the details of multi-viewpoint encoding processing in step S18 of FIG. 5. This multi-viewpoint encoding processing is done, for example, in units of slices. In the multi-viewpoint encoding processing of FIG. 6, the images to be encoded are the color image A, the color image B, the parallax related image A, and the parallax related image B.

In step S31 of FIG. 6, the multi-viewpoint image encoding unit 15 generates SPS of a target slice which is slice of processing target, and gives an ID unique to SPS. In step S32, the multi-viewpoint image encoding unit 15 generates Subset SPS of the target slice, and gives an ID unique to the Subset SPS.

In step S33, the multi-viewpoint image encoding unit 15 generates PPS of the target slice including the ID given in steps S31 and S32, and gives an ID unique to the PPS. In step S34, the multi-viewpoint image encoding unit 15 generates SEI including the viewpoint generation information of the target slice.

In step S35, the multi-viewpoint image encoding unit 15 encodes the target slice of the color image A as a base view, and adds a header portion including the ID given in step S33. In step S36, the multi-viewpoint image encoding unit 15 encodes the target slice of the parallax related image A as a non-base view, and adds a header portion including the ID given in step S33.

In step S37, the multi-viewpoint image encoding unit 15 encodes the target slice of the color image B as a non-base view, and adds a header portion including the ID given in step S33. In step S38, the multi-viewpoint image encoding unit 15 encodes the target slice of the parallax related image B as a non-base view, and adds a header portion including the ID given in step S33.

Then, the multi-viewpoint image encoding unit 15 generates an encoded bit stream by arranging, in order, the SPS, the Subset SPS, the PPS, the SEI, the target slice of the color image A, the target slice of the parallax related image A, the target slice of the color image B, and the target slice of the parallax related image B thus generated. Then, processing in step S18 in FIG. 5 is performed again, and subsequently step S19 is performed.

In the multi-viewpoint encoding processing of FIG. 6, for the sake of explanation, the SPS is generated in unit of slice, but when the SPS of the current target slice is the same as the SPS of the previous target slice, such SPS is not generated. The same can be said to Subset SPS, PPS, and SEI.

As described above, the encoding device 10 uses the multi-viewpoint corrected color image and the multi-viewpoint parallax related image to generate the viewpoint generation information in accordance with a predetermined method for generating a color image of another viewpoint, and transmits it together with the color image of the predetermined viewpoint and the parallax related image. Therefore, the decoding device explained later can use the color image of the predetermined viewpoint, the parallax related image, and the viewpoint generation information to generate the color image of a viewpoint different from the predetermined viewpoint.

[Example of Configuration of First Embodiment of Decoding Device]

Figure 7:
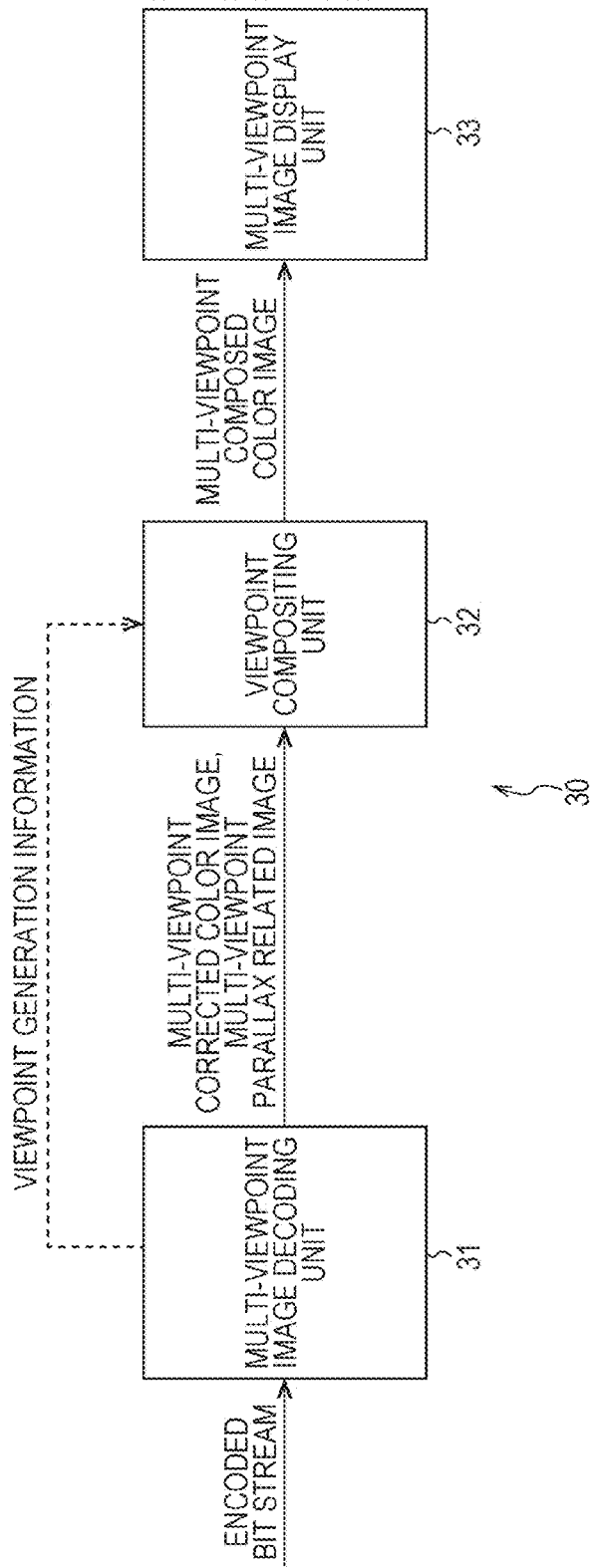
FIG. 7 is a block diagram illustrating an example of configuration of the first embodiment of a decoding device serving as an image processing apparatus to which the present technique is applied.

FIG. 7 is a block diagram illustrating an example of configuration of the first embodiment of a decoding device, serving as an image processing apparatus to which the present technique is applied, which decodes an encoded bit stream transmitted from the encoding device 10 of FIG. 2.

The decoding device 30 of FIG. 7 is constituted by a multi-viewpoint image decoding unit 31, a viewpoint compositing unit 32, and a multi-viewpoint image display unit 33.

The multi-viewpoint image decoding unit 31 of the decoding device 30 functions as a receiving unit, and receives the encoded bit stream transmitted from the encoding device 10 of FIG. 2. The multi-viewpoint image decoding unit 31 extracts the viewpoint generation information from the SEI of the received encoded bit stream, and provides the viewpoint generation information to the viewpoint compositing unit 32. The multi-viewpoint image decoding unit 31 functions as a decoding unit, and decodes the encoded bit stream in accordance with decoding method corresponding to the encoding method of the multi-viewpoint image encoding unit 15 of FIG. 2, and generates multi-viewpoint corrected color images and multi-viewpoint parallax related image. The multi-viewpoint image decoding unit 31 provides the multi-viewpoint corrected color images and the multi-viewpoint parallax related image to the viewpoint compositing unit 32.

The viewpoint compositing unit 32 uses the viewpoint generation information provided by the multi-viewpoint image decoding unit 31 to perform warping processing (the details of which will be explained later) on the multi-viewpoint parallax related image provided by the multi-viewpoint image decoding unit 31 for as many display viewpoints as the number of viewpoints corresponding to the multi-viewpoint image display unit 33.

More specifically, the viewpoint compositing unit 32 identifies the multi-viewpoint parallax related images for as many viewpoints as the number of viewpoints of the parallax related image from among the multi-viewpoint parallax related images and the multi-viewpoint corrected color images provided by the multi-viewpoint image decoding unit 31 on the basis of the parallax related image identification information included in the viewpoint generation information. Then, when the internal parameter flag included in the viewpoint generation information indicates presence of internal parameter, the viewpoint compositing unit 32 obtains the internal parameter from the viewpoint generation information. Then, when the external parameter flag included in the viewpoint generation information indicates presence of external parameter, the viewpoint compositing unit 32 obtains the external parameter from the viewpoint generation information. Then, the viewpoint compositing unit 32 performs warping processing on the multi-viewpoint parallax related image to warp the multi-viewpoint parallax related image according to the display viewpoints on the basis of the internal parameter and the external parameter thus obtained, and the image type information and the range information included in the viewpoint generation information.

The warping processing is processing for geometrically converting an image of a certain viewpoint into an image of another viewpoint. The display viewpoints include viewpoints other than the viewpoints corresponding to the multi-viewpoint color image.

The viewpoint compositing unit 32 uses the viewpoint generation information and the parallax related image of display viewpoints obtained as a result of warping processing to perform warping processing on the multi-viewpoint corrected color images provided by the multi-viewpoint image decoding unit 31 to warp them according to the display viewpoints. More specifically, viewpoint compositing unit 32 identifies the multi-viewpoint color images of as many viewpoints as the number of viewpoints of the color images from among the multi-viewpoint corrected color images and the multi-viewpoint parallax related image provided by the multi-viewpoint image decoding unit 31 on the basis of the color image identification information included in the viewpoint generation information. Then, the viewpoint compositing unit 32 uses the parallax related image for the display viewpoints obtained as a result of the warping processing to perform the warping processing on the multi-viewpoint corrected color images to warp them according to the display viewpoints.

The viewpoint compositing unit 32 provides the color images for the display viewpoints obtained as a result, to the multi-viewpoint image display unit 33 as the multi-viewpoint composed color images.

The multi-viewpoint image display unit 33 displays the multi-viewpoint composed color images provided by the viewpoint compositing unit 32 in such a manner that the viewable angle is different for each viewpoint. The viewer sees the images of two given viewpoints with their right and left eyes, thus seeing a 3D image from multiple viewpoints without wearing glasses.

[Explanation About Warping Processing of Depth Image]

Figure 8:
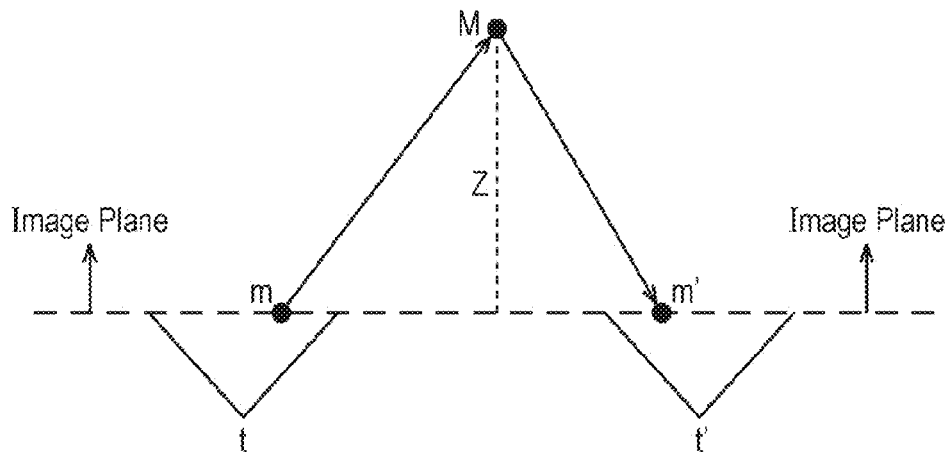
FIG. 8 is a figure explaining warping processing of a depth image.

FIG. 8 is a figure explaining warping processing of a depth image.

In the warping processing of the depth image, first, as illustrated in FIG. 8, a position m (x,y,z) of each pixel of the depth image for the viewpoint at a processing target position t ($t_x, t_y, t_z$) is associated, via three dimensional space, with a position m' (x',y',z') of the depth image for the display viewpoint at a warping-processed position t' ($t'_x, t'_y, t'_z$).

More specifically, the position M (X,Y,Z) on the world coordinate corresponding to the position m (x,y,z) on the screen for the pixel of which depth value (value y) is a value corresponding to the position Z (depth Z) in the world coordinate in the depth direction in the depth image for the viewpoint at the position t ($t_x, t_y, t_z$) is obtained according to the following expression (2), and the position m' (x',y',z') on the screen of the depth image for the display viewpoint at the position t' ($t'_x, t'_y, t'_z$) corresponding to the position M (X,Y,Z) is obtained.

$$(X,Y,Z)^T = RA^{-1}(x,y,1)^T Z + (t_x, t_y, t_z)^T$$

$$s(x',y',1)^T = A'R'^{-1}[(X,Y,Z)^T - (t'_x, t'_y, t'_z)^T] \quad (2)$$

In the expression (2), R is a rotation matrix for transforming the coordinate on the multi-viewpoint color image image-capturing unit 11 into the world coordinate, and is a fixed matrix determined in advance. R' is a rotation matrix for transforming the coordinate on the virtual image-capturing unit for capturing the color image corresponding to the warping-processed depth image into the world coordinate.

In the expression (2), A is a matrix for transforming the coordinate on the multi-viewpoint color image image-capturing unit 11 into the coordinate on the screen, and is represented by the following expression (3).

[Mathematical Formula 1]

$$A = \begin{bmatrix} \text{focal\_length\_x} & \text{radial\_distortion} & \text{principal\_point\_x} \\ 0.0 & \text{focal\_length\_y} & \text{principal\_point\_y} \\ 0.0 & 0.0 & 1.0 \end{bmatrix} \quad (3)$$

In the expression (3), focal_length_x, focal_length_y represent the focal distance of the multi-viewpoint color image image-capturing unit 11 in the horizontal direction and the vertical direction (y direction), respectively. It should be noted that principal_point_x, principal_point_y represent the positions of the principal points of the multi-viewpoint color image image-capturing unit 11 in the horizontal direction and the vertical direction, respectively. The radial_distortion represents a strain coefficient in the radius direction.

However, the viewpoint compositing unit 32 does not use the focal distance in the vertical direction and the position of the principal point in the vertical direction in the expression (3). Correction is made by the multi-viewpoint color image correction unit 12 so that the strain coefficient in the radius direction becomes zero.

A' is a matrix, expressed in the same manner as A, for transforming the coordinate of the virtual image-capturing unit for capturing the color image corresponding to the warping-processed depth image into the coordinate on the screen, and is determined in advance. In the expression (2), s is a scaling factor, and is a fixed value determined in advance. In this case, $t_y$ and $t_z$ are fixed values determined in advance.

Therefore, information other than the depth image required to associate the position m (x,y,z) and the position m' (x',y',z') is the focal distance in the horizontal direction, the position of the principal point in the horizontal direction, the position of the multi-viewpoint color image image-capturing unit 11 in the horizontal direction, and the depth minimum value and the depth maximum value required to transform the depth value into the position Z. Such information is included in the viewpoint generation information.

After the association is made as described above, the pixel of the depth image having been subjected to the warping processing corresponding to each pixel of the depth image of the processing target is determined on the basis of the position m' (x',y',z') corresponding to the position m (x,y,z) of each pixel. Then, the depth value of each pixel of the depth image of the processing target is adopted as the depth value of the pixel of the warping-processed depth image corresponding to the pixel.

It should be noted that the warping processing for the parallax image is done in the same manner as that performed on the depth image except that the depth value (value y) is replaced with the parallax value (value I).

[Explanation About Processing of Decoding Device]

Figure 9:
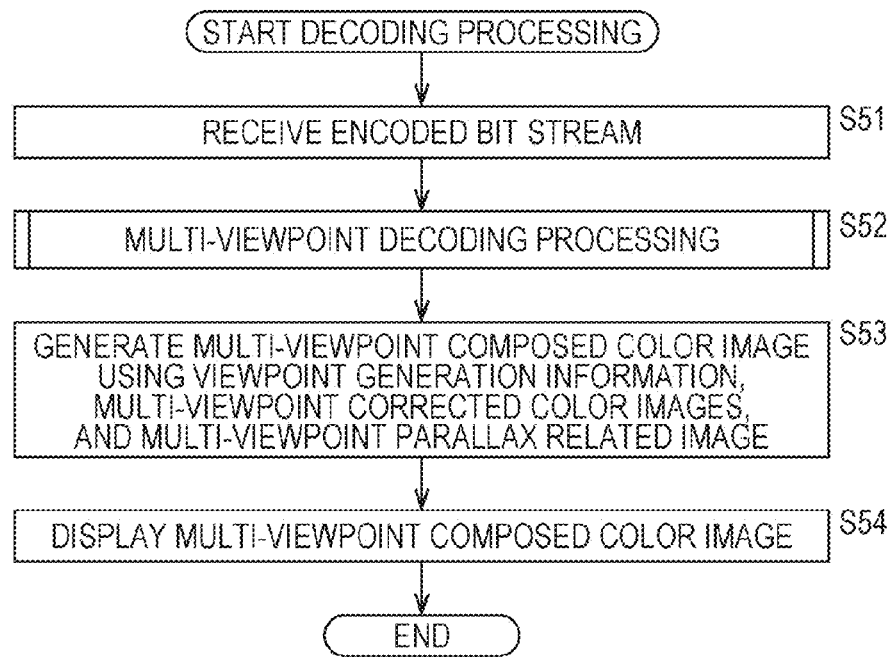
FIG. 9 is a flowchart explaining decoding processing of the decoding device of FIG. 7.

FIG. 9 is a flowchart explaining decoding processing of the decoding device 30 of FIG. 7. This decoding processing is started, for example, when the encoded bit stream is transmitted from the encoding device 10 of FIG. 2.

In step S51 of FIG. 9, the multi-viewpoint image decoding unit 31 of the decoding device 30 receives the encoded bit stream transmitted from the encoding device 10 of FIG. 2.

In step S52, the multi-viewpoint image decoding unit 31 decodes the received encoded bit stream, and performs the multi-viewpoint decoding processing for extracting the viewpoint generation information. The details of the multi-viewpoint decoding processing will be explained with reference to FIG. 10 explained later.

In step S53, the viewpoint compositing unit 32 functions as a generation unit, and generates the multi-viewpoint composed color image using the viewpoint generation information provided by the multi-viewpoint image decoding unit 31, the multi-viewpoint corrected color images, and the multi-viewpoint parallax related image.

In step S54, the multi-viewpoint image display unit 33 displays the multi-viewpoint composed color image provided by the viewpoint compositing unit 32 in such a manner that the viewable angle, and terminates the processing.

Figure 10:
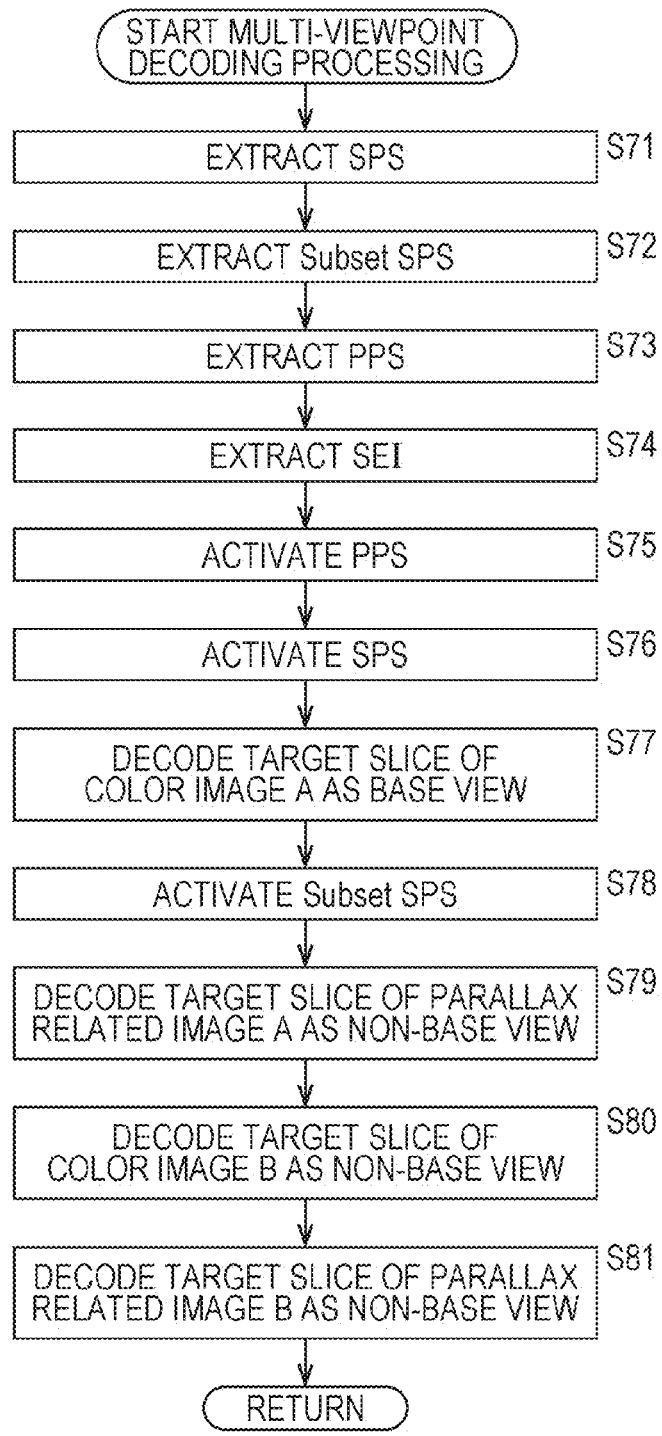
FIG. 10 is a flowchart explaining the details of multi-viewpoint decoding processing of FIG. 9.

FIG. 10 is a flowchart explaining the details of multi-viewpoint decoding processing in step S52 of FIG. 9. This multi-viewpoint decoding processing is done, for example, in units of slices. In the multi-viewpoint decoding processing of FIG. 10, the images of the decoding target are the color image A, the color image B, the parallax related image A, and the parallax related image B.

In step S71 of FIG. 10, the multi-viewpoint image decoding unit 31 extracts SPS from the received encoded bit stream. In step S72, the multi-viewpoint image decoding unit 31 extracts Subset SPS from the encoded bit stream. In step S73, the multi-viewpoint image decoding unit 31 extracts PPS from the encoded bit stream.

In step S74, the multi-viewpoint image decoding unit 31 extracts SEI from the encoded bit stream, and provides the viewpoint generation information included in the SEI to the viewpoint compositing unit 32.

In step S75, on the basis of the ID of PPS included in the header of the target slice of the color image A, the multi-viewpoint image decoding unit 31 activates the PPS to which the ID is given. In step S76, on the basis of the ID of SPS included in PPS and activated in step S75, the multi-viewpoint image decoding unit 31 activates the SPS to which the ID is given.

In step S77, the multi-viewpoint image decoding unit 31 looks up the PPS and the SPS activated, and decodes the target slice of the color image A as the base view, and provides it to the viewpoint compositing unit 32.

In step S78, on the basis of the ID of Subset SPS included in PPS and activated, the multi-viewpoint image decoding unit 31 activates the Subset SPS to which the ID is given. In step S79, the multi-viewpoint image decoding unit 31 looks up the PPS and the Subset SPS activated, and decodes the target slice of the parallax related image A as the non-base view, and provides it to the viewpoint compositing unit 32.

In step S80, the multi-viewpoint image decoding unit 31 looks up the PPS and the Subset SPS activated, and decodes the target slice of the color image B as the non-base view, and provides it to the viewpoint compositing unit 32. In step S81, the multi-viewpoint image decoding unit 31 looks up the PPS and the Subset SPS activated, and decodes the target slice of the parallax related image B as the non-base view, and provides it to the viewpoint compositing unit 32. Then, processing in step S52 in FIG. 9 is performed again, and subsequently step S53 is performed.

In the multi-viewpoint decoding processing of FIG. 10, for the sake of explanation, the SPS, the Subset SPS, the PPS, and the SEI are considered to be generated for all the slices, and are configured to be extracted at all times for each slice, but when there is a slice for which the SPS, the Subset SPS, the PPS, and the SEI are not generated, processing for extracting the SPS, the Subset SPS, the PPS, and the SEI is skipped.

As described above, the decoding device 30 receives, from the encoding device 10, the color image of the predetermined viewpoint and the parallax related image as well as the viewpoint generation information. Therefore, the decoding device 30 can use the color image of the predetermined viewpoint, the parallax related image, and the viewpoint generation information to generate the color image of a viewpoint different from the predetermined viewpoint.

In contrast, the bit stream encoded according to MVC method which is a conventional encoding method does not include necessary information for generating a color image of a viewpoint different from a predetermined viewpoint using the color image of the predetermined viewpoint and the parallax related image. More specifically, it does not include information for identifying the color image and parallax related image, information for identifying the parallax image and the depth image, and the range information.

The multiview acquisition information SEI as illustrated in FIG. 1 includes parameters for the inside of the camera and the outside of the camera, but includes much unnecessary information other than the viewpoint generation information. Further, in the multiview acquisition information SEI, the parameters for the inside of the camera are described for all the viewpoints or only for particular viewpoints, regardless of the types of the parameters. Therefore, when the parameters for the inside of the camera are described for all the viewpoints, it includes much redundant information, and when the parameters for only for particular viewpoints are described, such information is insufficient. In the multiview acquisition information SEI, the parameters outside of the camera are described for all the viewpoints, and therefore, much redundant information is included.

In the encoding device 10, the multi-viewpoint parallax related image is generated from the multi-viewpoint corrected color image, but it may be generated by sensors detecting the parallax value and the depth value during image capturing of the multi-viewpoint color image. This is applicable to the encoding device 50 explained later.

The viewpoint generation information may include any one of the color image identification information and the parallax related image identification information. In this case, the decoding device 30 identifies, as an image not identified, one of images of the multi-viewpoint color image and the multi-viewpoint parallax related image that is not identified. For example, the viewpoint generation information includes only the color image identification information, the decoding device 30 identifies the multi-viewpoint color image on the basis of the color image identification information, and determines that the images other than that are the multi-viewpoint parallax related images.

In the first embodiment, the viewpoint generation information is transmitted in the SEI. Alternatively, the viewpoint generation information may be included in the VCL (Video Coding Layer), the SPS (Sequence Parameter Set) and the PPS (Picture Parameter Set) of the NAL (Network Abstraction Layer), and the like.

Second Embodiment

[Example of Configuration of Second Embodiment of Encoding Device]

Figure 11:
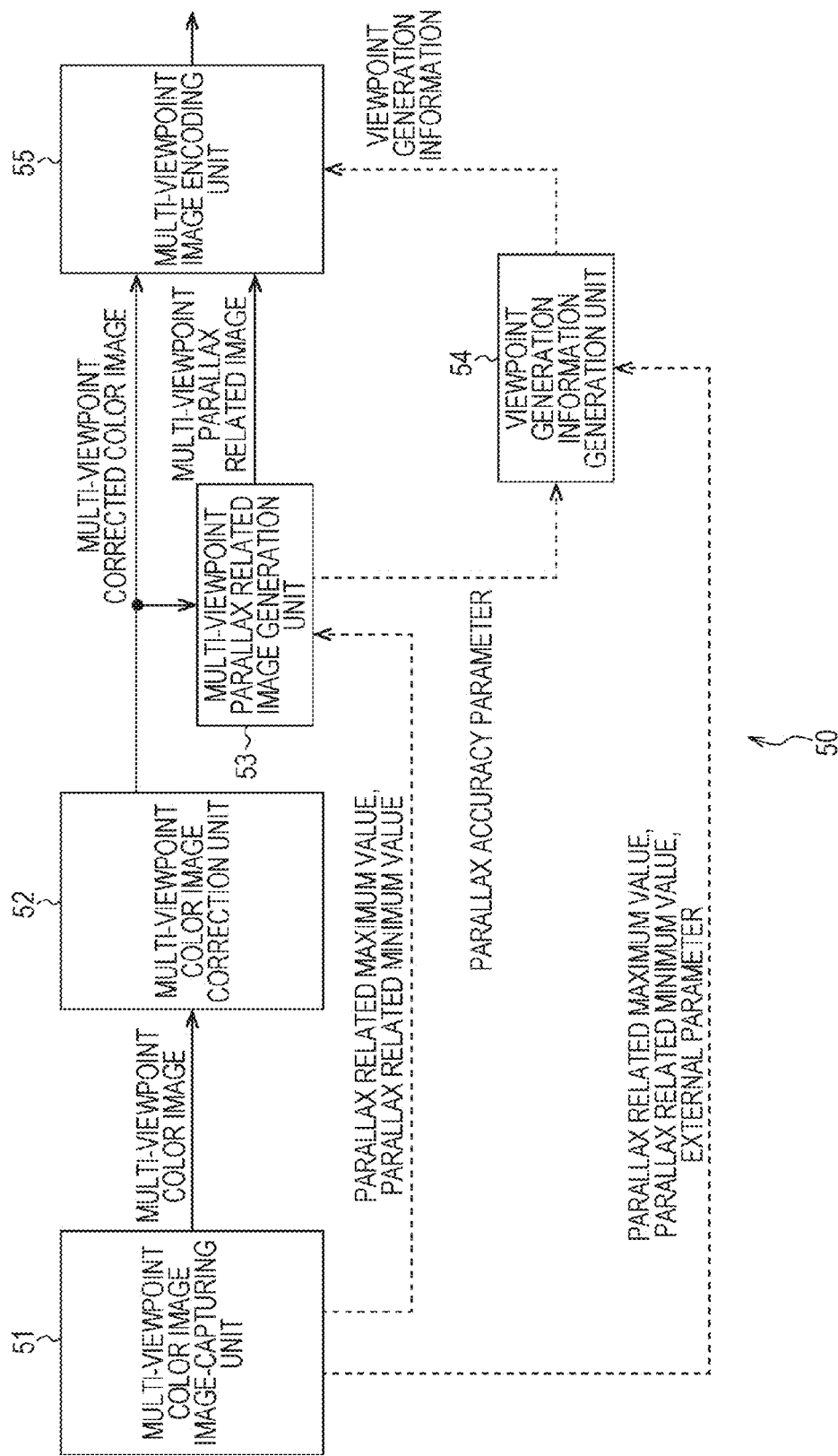
FIG. 11 is a block diagram illustrating an example of configuration of a second embodiment of an encoding device serving as an image processing apparatus to which the present technique is applied.

FIG. 11 is a block diagram illustrating an example of configuration of a second embodiment of an encoding device serving as an image processing apparatus to which the present technique is applied.

An encoding device 50 of FIG. 11 includes a multi-viewpoint color image image-capturing unit 51, a multi-viewpoint color image correction unit 52, a multi-viewpoint parallax related image generation unit 53, a viewpoint generation information generation unit 54, and a multi-viewpoint image encoding unit 55. The encoding device 50 transmits a portion of the viewpoint generation information as information about encoding (encoding parameter).

More specifically, the multi-viewpoint color image image-capturing unit 51 of the encoding device 10 captures color images of multiple viewpoints, and provides them as multi-viewpoint color images to the multi-viewpoint color image correction unit 52. The multi-viewpoint color image image-capturing unit 51 generates external parameter, parallax related maximum value (depth maximum value), and parallax related minimum value (depth minimum value) (the details of which will be explained later). The multi-viewpoint color image image-capturing unit 51 provides the external parameter, the parallax related maximum value, and the parallax related minimum value to the viewpoint generation information generation unit 54, and provides the parallax related maximum value and the parallax related minimum value to the multi-viewpoint parallax related image generation unit 53.

When the parallax related image generated by the multi-viewpoint parallax related image generation unit 53 is a depth image, the parallax related maximum value is a depth maximum value, and when it is a parallax image, the parallax related maximum value is a parallax maximum value. When the parallax related image generated by the multi-viewpoint parallax related image generation unit 53 is a depth image, the parallax related minimum value is a depth minimum value, and when it is a parallax image, the parallax related minimum value is a parallax minimum value.

The multi-viewpoint color image correction unit 52 performs color correction, brightness correction, distortion correction, and the like on the multi-viewpoint color images provided from the multi-viewpoint color image image-capturing unit 51. Accordingly, the focal distance of the multi-viewpoint color image image-capturing unit 51 in the corrected multi-viewpoint color image in the horizontal direction (X direction) is the same at all the viewpoints. The multi-viewpoint color image correction unit 52 provides the corrected multi-viewpoint color image to the multi-viewpoint parallax related image generation unit 53 and the multi-viewpoint image encoding unit 55 as multi-viewpoint corrected color images.

On the basis of the parallax related maximum value and the parallax related minimum value provided from the multi-viewpoint color image image-capturing unit 51, the multi-viewpoint parallax related image generation unit 53 generates parallax related images of multiple viewpoints from the multi-viewpoint corrected color images provided from the multi-viewpoint color image correction unit 52. More specifically, the multi-viewpoint parallax related image generation unit 53 obtains a parallax related value which has not yet normalized at each pixel (the reciprocal number 1/Z of the depth Z or the parallax d) from the multi-viewpoint corrected color image for each viewpoint of multiple viewpoints, and normalizes the parallax related value which has not yet normalized on the basis of the parallax related maximum value and the parallax related minimum value. Then, the multi-viewpoint parallax related image generation unit 53 generates a parallax related image in which the parallax related value (value y,value I) of each pixel normalized is a pixel value of the pixel of the parallax related image for each viewpoint of the multiple viewpoints.

Then, the multi-viewpoint parallax related image generation unit 53 provides the generated parallax related images of multiple viewpoints to the multi-viewpoint image encoding unit 55 as the multi-viewpoint parallax related image.

Further, the multi-viewpoint parallax related image generation unit 53 generates parallax accuracy parameter (depth accuracy parameter) representing the accuracy of the pixel value of the multi-viewpoint parallax related image, and provides the parallax accuracy parameter to the viewpoint generation information generation unit 54.

The viewpoint generation information generation unit 54 functions as a generation unit, and uses the multi-viewpoint corrected color image and the multi-viewpoint parallax related image to generate viewpoint generation information in accordance with a predetermined method for generating a color image of another viewpoint. More specifically, the viewpoint generation information generation unit 54 obtains the inter-camera distance on the basis of the external parameters provided by the multi-viewpoint color image image-capturing unit 51. The inter-camera distance is a distance between the position of the multi-viewpoint color image image-capturing unit 51 in the horizontal direction when the multi-viewpoint color image image-capturing unit 51 captures a color image at each viewpoint of the multi-viewpoint parallax related image and the position of the multi-viewpoint color image image-capturing unit 51 in the horizontal direction when the multi-viewpoint color image image-capturing unit 51 captures a color image having a parallax corresponding to the parallax related image with respect to the color image thus captured.

The viewpoint generation information generation unit 54 adopts, as viewpoint generation information, the parallax related maximum value and the parallax related minimum value provided by the multi-viewpoint color image image-capturing unit 51, the inter-camera distance, and the parallax accuracy parameter provided by the multi-viewpoint parallax related image generation unit 53. The viewpoint generation information generation unit 54 provides the generated viewpoint generation information to the multi-viewpoint image encoding unit 55.

The multi-viewpoint image encoding unit 55 functions as an encoding unit, and encodes the multi-viewpoint corrected color image provided by the multi-viewpoint color image correction unit 52 and the multi-viewpoint parallax related image provided by the multi-viewpoint parallax related image generation unit 53 in accordance with the method according to HEVC (High Efficiency Video Coding) method. As of August, 2011, Thomas Wiegand, Woo-jin Han, Benjamin Bross, Jens-Rainer Ohm, Gary J. Sullivian, "WD3: Working Draft3 of High-Efficiency Video Coding", JCTVC-E603_d5 (version 5), May 20, 2011 was issued as a draft with regard to HEVC method.

The multi-viewpoint image encoding unit 55 performs differential encoding on the parallax related maximum value, the parallax related minimum value, and the inter-camera distance in the viewpoint generation information provided by the viewpoint generation information generation unit 54, and causes such information to be included information about encoding of the multi-viewpoint parallax related image. Then, the multi-viewpoint image encoding unit 55 transmits as an encoded bit stream, a bit stream including the multi-viewpoint corrected color images and the multi-viewpoint parallax related image which are encoded, the parallax related maximum value and the parallax related minimum value which are differential-encoded, the information about encoding including the inter-camera distance, the parallax accuracy parameter provided by the viewpoint generation information generation unit 54, and the like.

As described above, the multi-viewpoint image encoding unit 55 differential-encodes and transmits the parallax related maximum value, the parallax related minimum value, and the inter-camera distance, and therefore, can reduce the amount of codes of the viewpoint generation information. In order to provide comfortable 3D image, it is likely not to greatly change the parallax related maximum value, the parallax related minimum value, and the inter-camera distance between pictures, and therefore, the differential encoding is effective for reducing the amount of codes.

[Explanation About Viewpoint Generation Information]

Figure 12:
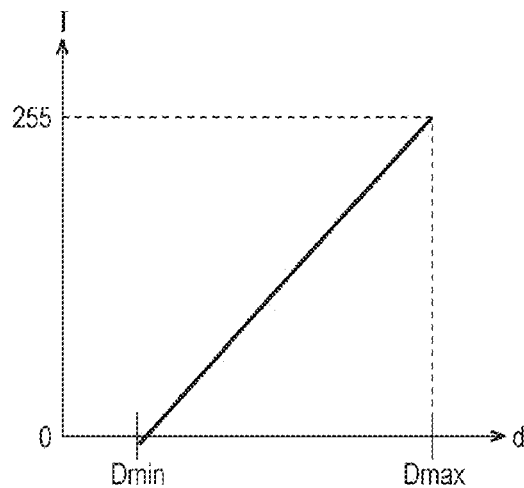
FIG. 12 is a figure explaining a parallax related maximum value and a parallax related minimum value of viewpoint generation information.

FIG. 12 is a figure explaining a parallax related maximum value and a parallax related minimum value of viewpoint generation information.

In FIG. 12, the horizontal axis denotes the parallax related value that is not normalized, and the vertical axis denotes the pixel value of the parallax related image (depth information).

As illustrated in FIG. 12, the multi-viewpoint parallax related image generation unit 53 normalizes the non-normalized parallax related value of each pixel (the reciprocal number 1/Z of the depth Z or parallax d) into, for example, a value of 0 to 255, using the parallax related minimum value Dmin and the parallax related maximum value Dmax. Then, the multi-viewpoint parallax related image generation unit 53 generates a parallax related image in which the normalized parallax related value of each pixel which is a value of any one of 0 and 255 (depth information) is a pixel value.

More specifically, as described above, the pixel value I of each pixel in the parallax related image is represented by the following expression (4), using the non-normalized parallax related value d (parallax d), the parallax related minimum value $D_{min}$, and the parallax related maximum value $D_{max}$ of that pixel.

[Mathematical Formula 2]

$$I = \frac{255 * (d - D_{min})}{D_{max} - D_{min}} \tag{4}$$

Therefore, in the decoding device explained later, it is necessary to restore the non-normalized parallax related value d from the pixel value I of each pixel in the parallax related image in accordance with the following expression (5) using the parallax related minimum value $D_{min}$ and the parallax related maximum value $D_{max}$.

[Mathematical Formula 3]

$$d = \frac{I}{255}(D_{max} - D_{min}) + D_{min} \tag{5}$$

More specifically, as described above, the pixel value y of each pixel in the parallax related image is represented by the expression (c), using the non-normalized parallax related value Z (parallax Z), the parallax related minimum value $Z_{near}$, and the parallax related maximum value $Z_{far}$ of that pixel. Therefore, in the decoding device explained later, it is necessary to restore the parallax related value Z from the pixel value y of each pixel in the parallax related image using the parallax related minimum value $Z_{near}$ and the parallax related maximum value $Z_{far}$. Accordingly, the parallax related minimum value and the parallax related maximum value are transmitted to the decoding device.

Figure 13:
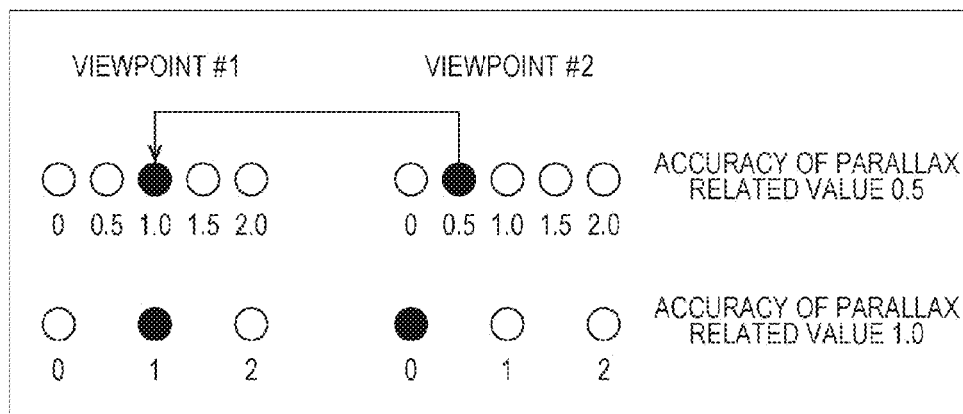
FIG. 13 is a figure explaining parallax accuracy parameter of the viewpoint generation information.

FIG. 13 is a figure explaining parallax accuracy parameter of the viewpoint generation information.

As illustrated in the upper stage of FIG. 13, when the non-normalized parallax related value (the reciprocal number 1/Z of the depth Z or parallax d) per normalized parallax related value (depth information) is 0.5, the parallax accuracy parameter represents 0.5 which is the accuracy of the normalized parallax related value (depth information). As illustrated in the lower stage of FIG. 13, when the non-normalized parallax related value per normalized parallax related value is one, the parallax accuracy parameter represents 1.0 which is the accuracy of the parallax related value.

In the example of FIG. 13, the non-normalized parallax related value at the viewpoint #1 at the first viewpoint is 1.0, and the non-normalized parallax related value at the viewpoint #2 at the second viewpoint is 0.5. Therefore, the normalized parallax related value of the viewpoint #1 is 1.0 even though the accuracy of the parallax related value is either 0.5 or 1.0. On the other hand, the parallax related value of the viewpoint #2 is 0.5 even though the accuracy of the parallax related value is 0.5, and the parallax related value of the viewpoint #2 is 0 even though the accuracy of the parallax related value is 1.0.

Figure 14:
FIG. 14 is a figure explaining an inter-camera distance of the viewpoint generation information.

FIG. 14 is a figure explaining an inter-camera distance of the viewpoint generation information.

As illustrated in FIG. 14, the inter-camera distance of the parallax related image of the viewpoint #1 with respect to the viewpoint #2 is a distance between the position represented by the external parameter of the viewpoint #1 and the position represented by the external parameter of the viewpoint #2.

[Example of Configuration of Multi-Viewpoint Image Encoding Unit]

Figure 15:
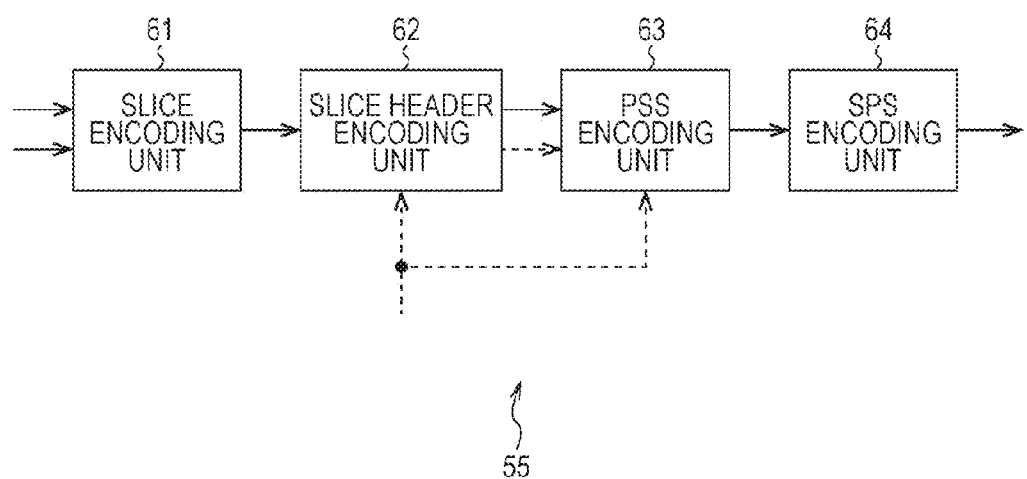
FIG. 15 is a block diagram illustrating an example of configuration of the multi-viewpoint image encoding unit of FIG. 11.

FIG. 15 is a block diagram illustrating an example of configuration of the multi-viewpoint image encoding unit 55 of FIG. 11.

The multi-viewpoint image encoding unit 55 of FIG. 15 includes a slice encoding unit 61, a slice header encoding unit 62, a PPS encoding unit 63, and an SPS encoding unit 64.

The slice encoding unit 61 of the multi-viewpoint image encoding unit 55 encodes the multi-viewpoint corrected color image provided by the multi-viewpoint color image correction unit 52 and the multi-viewpoint parallax related image provided by the multi-viewpoint parallax related image generation unit 53 in accordance with the method according to the HEVC method in units of slices. The slice encoding unit 61 provides the slice header encoding unit 62 with encoded data in units of slices obtained as a result of encoding.

The slice header encoding unit 62 determines that the parallax related maximum value, the parallax related minimum value, and the inter-camera distance in the viewpoint generation information provided by the viewpoint generation information generation unit 54 are the parallax related maximum value, the parallax related minimum value, and the inter-camera distance of the slice of the current processing target, and holds them.

The slice header encoding unit 62 also determines whether the parallax related maximum value, the parallax related minimum value, and the inter-camera distance of the slice of the current processing target are the same as the parallax related maximum value, the parallax related minimum value, and the inter-camera distance of the previous slice in the order of encoding with respect to the slice, and this determination is made in unit to which the same PPS is given (hereinafter referred to as the same PPS unit).

Then, when all the parallax related maximum value, the parallax related minimum value, and the inter-camera distance of the slice constituting the same PPS unit are determined to be the same as the parallax related maximum value, the parallax related minimum value, and the inter-camera distance of the previous slice in the order of encoding, the slice header encoding unit 62 adds information about encoding other than the parallax related maximum value, the parallax related minimum value, and the inter-camera distance of that slice as the slice header of the encoded data of each slice constituting the same PPS unit, and provides the information to the PPS encoding unit 63. The slice header encoding unit 62 provides the PPS encoding unit 63 with a transmission flag indicating absence of transmission of the difference-encoded results of the parallax related maximum value, the parallax related minimum value, and the inter-camera distance.

On the other hand, when all the parallax related maximum value, the parallax related minimum value, and the inter-camera distance of at least one slice constituting the same PPS unit are determined not to be the same as the parallax related maximum value, the parallax related minimum value, and the inter-camera distance of the previous slice in the order of encoding, the slice header encoding unit 62 adds information about encoding including the parallax related maximum value, the parallax related minimum value, and the inter-camera distance of that slice as the slice header to the encoded data of the intra-type slice, and provides the information to the PPS encoding unit 63.

The slice header encoding unit 62 performs difference encoding on the parallax related maximum value, the parallax related minimum value, and the inter-camera distance of the inter-type slice. More specifically, the slice header encoding unit 62 subtracts the parallax related maximum value, the parallax related minimum value, and the inter-camera distance of the previous slice in the order of encoding with respect to the slice from the parallax related maximum value, the parallax related minimum value, and the inter-camera distance of the inter-type slice, respectively, and obtains a difference-encoded result. Then, the slice header encoding unit 62 adds information about encoding including the difference-encoded result of the parallax related maximum value, the parallax related minimum value, and the inter-camera distance as the slice header to the encoded data of the inter-type slice, and provides the information to the PPS encoding unit 63.

In this case, the slice header encoding unit 62 provides the PPS encoding unit 63 with a transmission flag indicating presence of transmission of the difference-encoded results of the parallax related maximum value, the parallax related minimum value, and the inter-camera distance.

The PPS encoding unit 63 generates PPS including the transmission flag provided from the slice header encoding unit 62 and the parallax accuracy parameter in the viewpoint generation information provided from the viewpoint generation information generation unit 54 of FIG. 11. The PPS encoding unit 63 adds, in the same PPS unit, the PPS to the encoded data in units of slices to which the slice header provided from the slice header encoding unit 62 is added, and provides it to the SPS encoding unit 64.

The SPS encoding unit 64 generates SPS. Then, the SPS encoding unit 64 adds, in units of sequences, the SPS to the encoded data to which the PPS provided from the PPS encoding unit 63 is added. The SPS encoding unit 64 transmits, as an encoded bit stream, the bit stream obtained as a result.

[Example of Configuration of Encoded Bit Stream]

Figure 16:
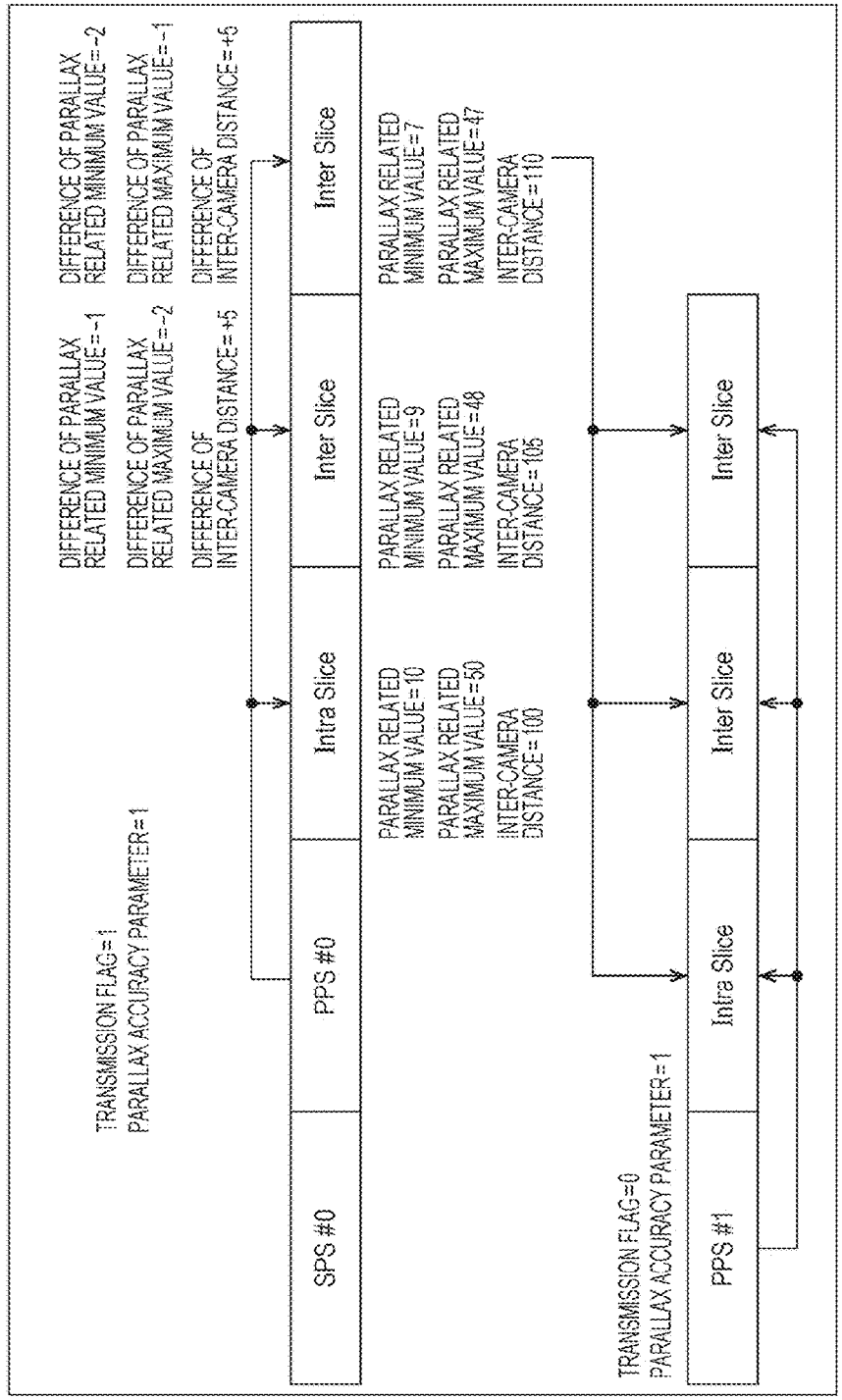
FIG. 16 is a figure illustrating an example of configuration of an encoded bit stream.

FIG. 16 is a figure illustrating an example of configuration of an encoded bit stream.

In FIG. 16, for the sake of explanation, only encoded data of slice of the multi-viewpoint parallax related image are described. But in reality, the encoded bit stream is also arranged with the encoded data of slice of the multi-viewpoint color image.

In the example of FIG. 16, the parallax related maximum value, the parallax related minimum value, and the inter-camera distance of the two inter-type slices and one intra-type slice constituting the same PPS unit of the PPS #0 which is the 0th PPS are not the same as the parallax related maximum value, the parallax related minimum value, and the inter-camera distance, respectively, of the previous slice in the order of encoding. Therefore, the PPS #0 includes a transmission flag "1" indicating presence of transmission. In the example of FIG. 16, the parallax accuracy of the slice constituting the same PPS unit of the PPS #0 is 0.5, and the PPS #0 includes "1" representing the parallax accuracy 0.5 as the parallax accuracy parameter.

Further, in the example of FIG. 16, the parallax related minimum value of the intra-type slice constituting the same PPS unit of the PPS #0 is 10, and the parallax related maximum value thereof is 50, and the inter-camera distance thereof is 100. Therefore, the slice header of the slice includes the parallax related minimum value "10", the parallax related maximum value "50", and the inter-camera distance "100".

In the example of FIG. 16, the parallax related minimum value of the first inter-type slice constituting the same PPS unit of the PPS #0 is 9, and the parallax related maximum value thereof is 48, and the inter-camera distance thereof is 105. Therefore, the slice header of the slice includes, as the difference-encoded result of the parallax related minimum value, difference "−1" which is obtained by subtracting the parallax related minimum value "10" of the intra-type slice which is arranged before the slice in the order of encoding from the parallax related minimum value "9" of the slice. Likewise, the difference "−2" of the parallax related maximum value is included as the difference-encoded result of the parallax related maximum value, and the difference "5" of the inter-camera distance is included as the difference-encoded result of the inter-camera distance.

Further, in the example of FIG. 16, the parallax related minimum value of the second inter-type slice constituting the same PPS unit of the PPS #0 is 7, and the parallax related maximum value thereof is 47, and the inter-camera distance thereof is 110. Therefore, the slice header of the slice includes, as the difference-encoded result of the parallax related minimum value, difference "−2" which is obtained by subtracting the parallax related minimum value "9" of the first inter-type slice which is arranged before the slice in the order of encoding from the parallax related minimum value "7" of the slice. Likewise, the difference "−1" of the parallax related maximum value is included as the difference-encoded result of the parallax related maximum value, and the difference "5" of the inter-camera distance is included as the difference-encoded result of the inter-camera distance.

In the example of FIG. 16, the parallax related maximum value, the parallax related minimum value, and the inter-camera distance of the two inter-type slices and one intra-type slice constituting the same PPS unit of the PPS #1 which is the 1st PPS are the same as the parallax related maximum value, the parallax related minimum value, and the inter-camera distance, respectively, of the previous slice in the order of encoding. More specifically, the parallax related maximum value, the parallax related minimum value, and the inter-camera distance of the two inter-type slices and one intra-type slice constituting the same PPS unit of the PPS #1 which is the 1st PPS are "7", "47", and "110", respectively, which are the same as those of the second inter-type slice constituting the same PPS unit of the PPS #0. Therefore, the PPS #1 includes a transmission flag "0" indicating absence of transmission. In the example of FIG. 16, the parallax accuracy of the slice constituting the same PPS unit of the PPS #1 is 0.5, and the PPS #1 includes "1" representing the parallax accuracy 0.5 as the parallax accuracy parameter.

[Example of Syntax of PPS]

FIG. 17 is a figure illustrating an example of syntax of PPS of FIG. 16.

As illustrated in FIG. 17, the PPS includes parallax accuracy parameter (disparity_precision) and transmission flag (dsiparity_pic_same_flag). For example, the parallax accuracy parameter is "0" when it indicates the parallax accuracy (the accuracy of the depth information) 1, and the parallax accuracy parameter is "2" when it indicates the parallax accuracy (the accuracy of the depth information) 0.25. As described above, the parallax accuracy parameter is "1" when it indicates the parallax accuracy (the accuracy of the depth information) 0.5. As described above, the transmission flag is "1" when it indicates presence of transmission, and the transmission flag is "0" when it indicates absence of transmission.

[Example of Syntax of Slice Header]

FIGS. 18 and 19 are figures illustrating an example of syntax of slice header.

As illustrated in FIG. 19, when the transmission flag is 1, and the type of the slice is intra-type, the slice header includes the parallax related minimum value (minimum_disparity), the parallax related maximum value (maximum_disparity), and the inter-camera distance (translation_x).

On the other hand, when the transmission flag is 1, and the type of the slice is inter-type, the slice header includes the difference-encoded result of the parallax related minimum value (delta_minimum_disparity), the difference-encoded result of the parallax related maximum value (delta_maximum_disparity), and the difference-encoded result of the inter-camera distance (delta_translation_x).

[Explanation About Processing of Encoding Device]

Figure 20:
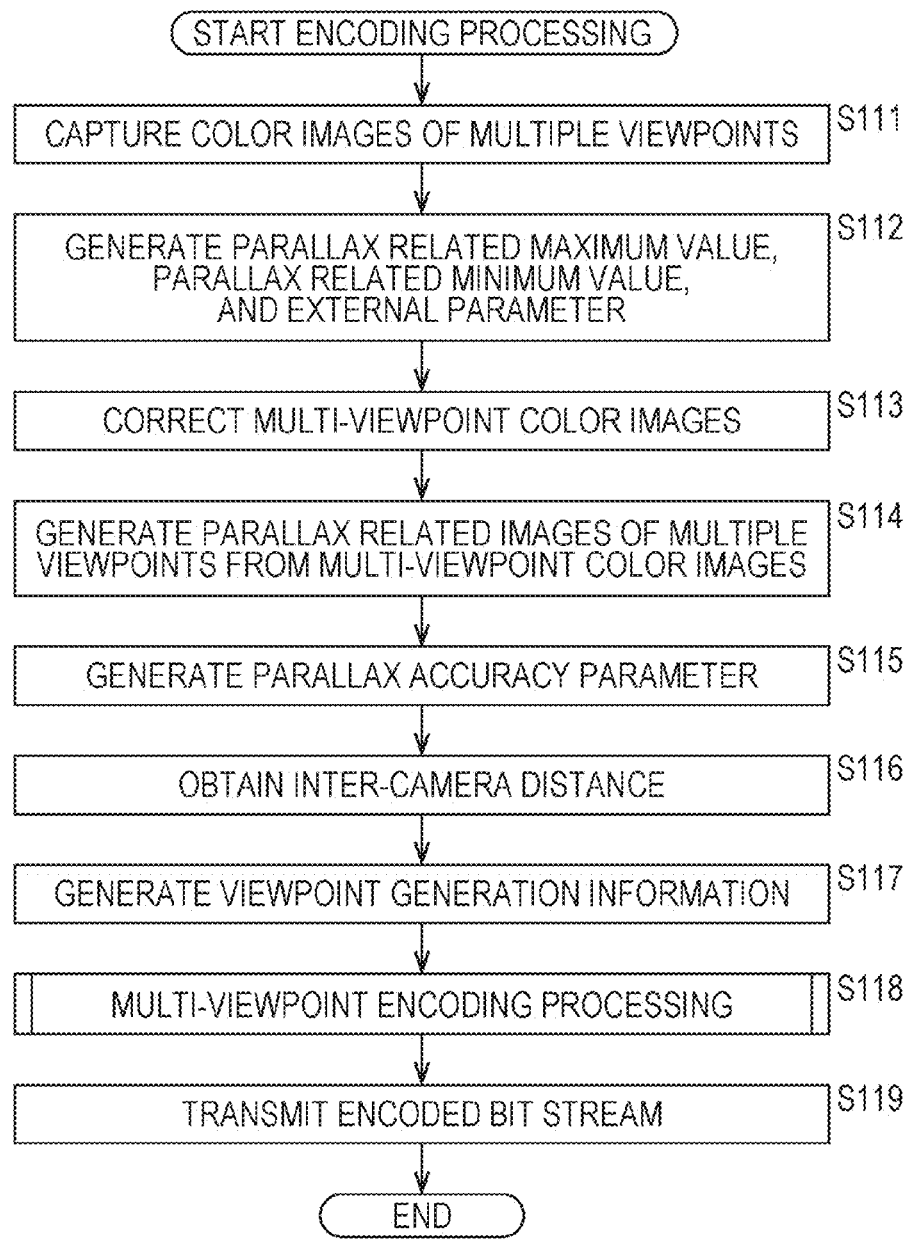
FIG. 20 is a flowchart explaining encoding processing of the encoding device of FIG. 11.

FIG. 20 is a flowchart explaining encoding processing of the encoding device 50 of FIG. 11.

In step S111 of FIG. 20, the multi-viewpoint color image image-capturing unit 51 of the encoding device 50 captures color images of multiple viewpoints, and provides them as multi-viewpoint color images to the multi-viewpoint color image correction unit 52.

In step S112, the multi-viewpoint color image image-capturing unit 51 generates the parallax related maximum value, the parallax related minimum value, and the external parameter. The multi-viewpoint color image image-capturing unit 51 provides the parallax related maximum value, the parallax related minimum value, and the external parameter to the viewpoint generation information generation unit 54, and provides the parallax related maximum value and the parallax related minimum value to the multi-viewpoint parallax related image generation unit 53.

In step S113, the multi-viewpoint color image correction unit 52 performs color correction, brightness correction, distortion correction, and the like on the multi-viewpoint color images provided from the multi-viewpoint color image image-capturing unit 51. Accordingly, the focal distance of the multi-viewpoint color image image-capturing unit 51 in the corrected multi-viewpoint color image in the horizontal direction (X direction) is the same at all the viewpoints. The multi-viewpoint color image correction unit 52 provides the corrected multi-viewpoint color image to the multi-viewpoint parallax related image generation unit 53 and the multi-viewpoint image encoding unit 55 as multi-viewpoint corrected color images.

In step S114, on the basis of the parallax related maximum value and the parallax related minimum value provided from the multi-viewpoint color image image-capturing unit 51, the multi-viewpoint parallax related image generation unit 53 generates parallax related images of multiple viewpoints from the multi-viewpoint corrected color images provided from the multi-viewpoint color image correction unit 52. Then, the multi-viewpoint parallax related image generation unit 53 provides the generated parallax related images of multiple viewpoints to the multi-viewpoint image encoding unit 55 as the multi-viewpoint parallax related image.

In step S115, the multi-viewpoint parallax related image generation unit 53 generates parallax accuracy parameters, and provides the parallax accuracy parameters to the viewpoint generation information generation unit 54.

In step S116, the viewpoint generation information generation unit 54 obtains the inter-camera distance on the basis of the external parameters provided by the multi-viewpoint color image image-capturing unit 51.

In step S117, the viewpoint generation information generation unit 54 generates, as viewpoint generation information, the parallax related maximum value and the parallax related minimum value provided by the multi-viewpoint color image image-capturing unit 51, the inter-camera distance, and the parallax accuracy parameter provided by the multi-viewpoint parallax related image generation unit 53. The viewpoint generation information generation unit 54 provides the generated viewpoint generation information to the multi-viewpoint image encoding unit 55.

In step S118, the multi-viewpoint image encoding unit 55 performs the multi-viewpoint encoding processing for encoding the multi-viewpoint corrected color image provided by the multi-viewpoint color image correction unit 52 and the multi-viewpoint parallax related image provided by the multi-viewpoint parallax related image generation unit 53 in accordance with the method according to HEVC method. The details of the multi-viewpoint encoding processing will be explained with reference to FIG. 21 explained later.

In step S119, the multi-viewpoint image encoding unit 55 transmits the encoded bit stream obtained as a result of the multi-viewpoint encoding processing, and terminates the processing.

Figure 21:
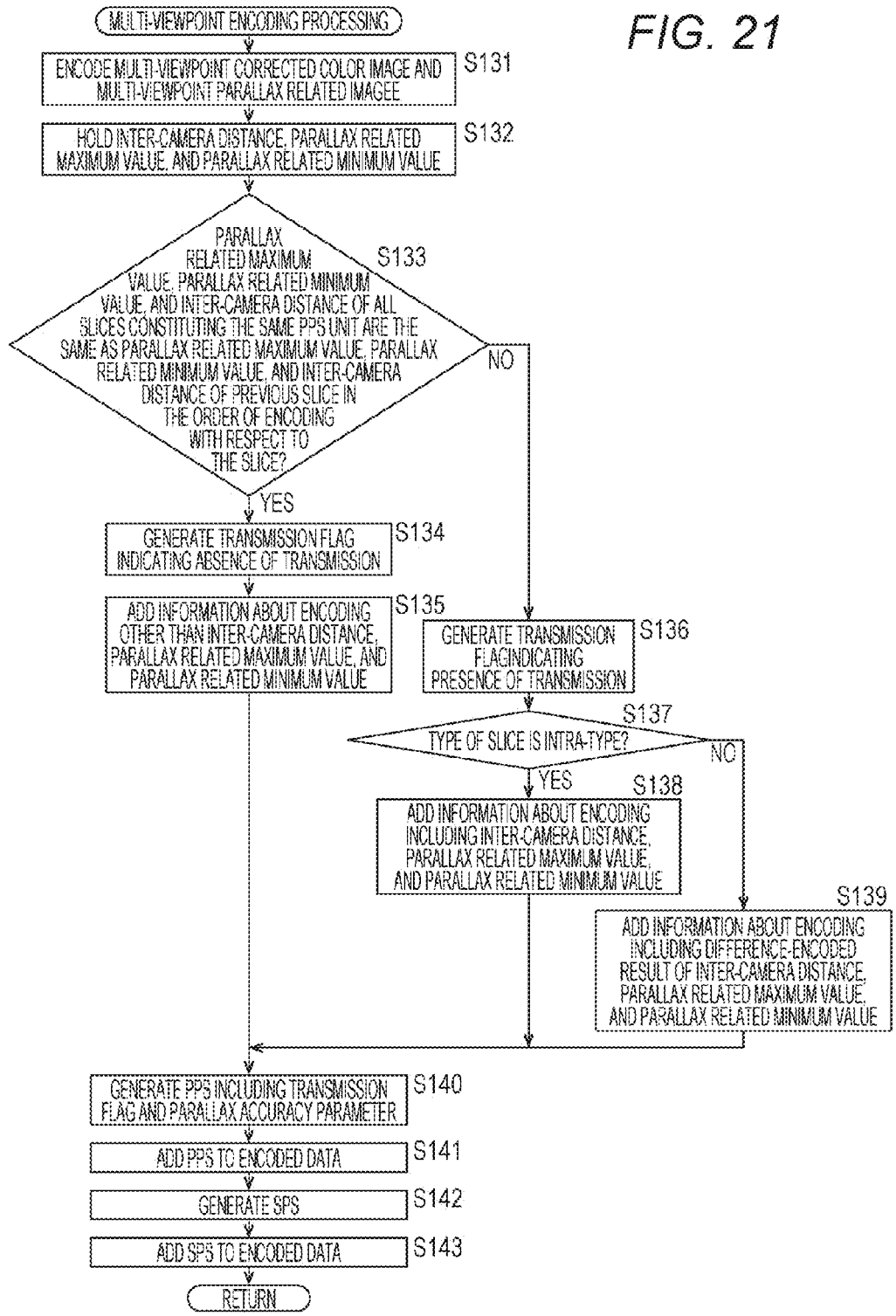
FIG. 21 is a flowchart explaining the multi-viewpoint encoding processing of FIG. 20.

FIG. 21 is a flowchart explaining the multi-viewpoint encoding processing in step S118 of FIG. 20.

In step S131 of FIG. 21, the slice encoding unit 61 of the multi-viewpoint image encoding unit 55 (FIG. 15) encodes the multi-viewpoint corrected color image provided by the multi-viewpoint color image correction unit 52 and the multi-viewpoint parallax related image provided by the multi-viewpoint parallax related image generation unit 53 in accordance with the method according to the HEVC method in units of slices. The slice encoding unit 61 provides the slice header encoding unit 62 with encoded data in units of slices obtained as a result of encoding.

In step S132, the slice header encoding unit 62 determines that the parallax related maximum value, the parallax related minimum value, and the inter-camera distance in the viewpoint generation information provided by the viewpoint generation information generation unit 54 are the parallax related maximum value, the parallax related minimum value, and the inter-camera distance of the slice of the current processing target, and holds them.

In step S133, the slice header encoding unit 62 determines whether the parallax related maximum value, the parallax related minimum value, and the inter-camera distance of all the slices constituting the same PPS unit are the same as the parallax related maximum value, the parallax related minimum value, and the inter-camera distance of the previous slice in the order of encoding with respect to the slice.

When the inter-camera distance, the parallax related maximum value, and the parallax related minimum value are determined to be the same in step S133, the slice header encoding unit 62 generates a transmission flag indicating absence of transmission of the difference-encoded results of the parallax related maximum value, the parallax related minimum value, and the inter-camera distance, and provides it to the PPS encoding unit 63 in step S134.

In step S135, the slice header encoding unit 62 adds, as slice header, information about encoding other than the inter-camera distance, the parallax related maximum value, and the parallax related minimum value of that slice to the encoded data of each slice constituting the same PPS unit which is the processing target of step S133. Then, the slice header encoding unit 62 provides the PPS encoding unit 63 with the encoded data of each slice constituting the same PPS unit obtained as a result, and proceeds to processing in step S140.

On the other hand, when the inter-camera distance, the parallax related maximum value, and the parallax related minimum value are determined not to be the same in step S133, the slice header encoding unit 62 generates a transmission flag indicating presence of transmission of the difference-encoded results of the parallax related maximum value, the parallax related minimum value, and the inter-camera distance, and provides it to the PPS encoding unit 63 in step S136. The processing in steps S137 to S139 explained later is performed for each slice constituting the same PPS unit which is the processing target of step S133.

In step S137, the slice header encoding unit 62 determines whether the type of the slice constituting the same PPS unit which is the processing target of step S133 is intra-type or not. When the type of the slice is determined to be the intra-type in step S137, the slice header encoding unit 62 adds information about encoding including the parallax related maximum value, the parallax related minimum value, and the inter-camera distance of that slice as the slice header to the encoded data of that slice in step S138. Then, the slice header encoding unit 62 provides the PPS encoding unit 63 with the encoded data in units of slices obtained as a result, and proceeds to the processing in step S140.

On the other hand, when the type of the slice is determined not to be the intra-type in step S137, more specifically, when the type of the slice is determined to be the inter-type, the processing in step S139 is performed. In step S139, the slice header encoding unit 62 performs difference encoding on the inter-camera distance, the parallax related maximum value, and the parallax related minimum value of that slice, and adds, as slice header, information about encoding including the difference-encoded result to that encoded data of that slice. Then, the slice header encoding unit 62 provides the PPS encoding unit 63 with the encoded data in units of slices obtained as a result, and proceeds to the processing in step S140.

In step S140, the PPS encoding unit 63 generates PPS including the transmission flag provided from the slice header encoding unit 62 and the parallax accuracy parameter in the viewpoint generation information provided from the viewpoint generation information generation unit 54 of FIG. 11.

In step S141, the PPS encoding unit 63 adds, in the same PPS unit, the PPS to the encoded data in units of slices to which the slice header provided from the slice header encoding unit 62 is added, and provides it to the SPS encoding unit 64.

In step S142, the SPS encoding unit 64 generates SPS.

In step S143, the SPS encoding unit 64 adds, in units of sequences, the SPS to the encoded data to which the PPS provided from the PPS encoding unit 63 is added, and generates an encoded bit stream.

As described above, the encoding device 50 arranges the inter-camera distance, the parallax related maximum value, and the parallax related minimum value in the slice header as information about encoding. Accordingly, for example, the inter-camera distance, the parallax related maximum value, and the parallax related minimum value can be used for encoding.

[Example of Configuration of Second Embodiment of Decoding Device]

Figure 22:
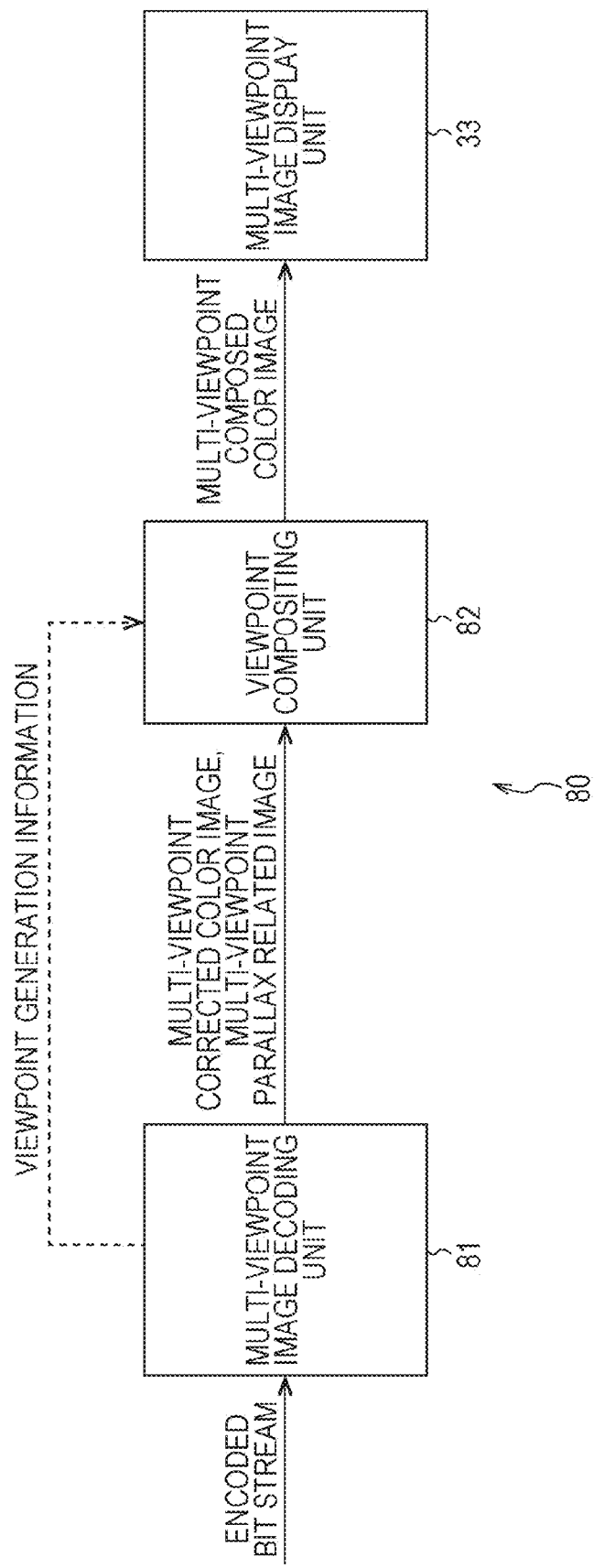
FIG. 22 is a block diagram illustrating an example of configuration of the second embodiment of a decoding device serving as an image processing apparatus to which the present technique is applied.

FIG. 22 is a block diagram illustrating an example of configuration of the second embodiment of a decoding device, serving as an image processing apparatus to which the present technique is applied, which decodes an encoded bit stream transmitted from the encoding device 50 of FIG. 11.

In the configuration as illustrated in FIG. 22, the same configurations as those of FIG. 7 are denoted with the same reference numerals. Repeated explanations are omitted as necessary.

The configuration of the decoding device 80 of FIG. 22 is different from the configuration of FIG. 7 in that the decoding device 80 includes a multi-viewpoint image decoding unit 81 and a viewpoint compositing unit 82 instead of the multi-viewpoint image decoding unit 31 and the viewpoint compositing unit 32. The decoding device 80 displays multi-viewpoint composed color images on the basis of the viewpoint generation information transmitted from the encoding device 50.

More specifically, the multi-viewpoint image decoding unit 81 of the decoding device 80 functions as a receiving unit, and receives the encoded bit stream transmitted from the encoding device 50 of FIG. 11. The multi-viewpoint image decoding unit 81 extracts the parallax accuracy parameter and the transmission flag from the PPS included in the received encoded bit stream. The multi-viewpoint image decoding unit 81 extracts the inter-camera distance, the parallax related maximum value, and the parallax related minimum value from the slice header of the encoded bit stream in accordance with the transmission flag. The multi-viewpoint image decoding unit 81 generates viewpoint generation information including the parallax accuracy parameter, the inter-camera distance, the parallax related maximum value, and the parallax related minimum value, and provides it to the viewpoint compositing unit 82.

The multi-viewpoint image decoding unit 81 functions as a decoding unit, and decodes the encoded data in units of slices included in the encoded bit stream in accordance with the method corresponding to the encoding method of the multi-viewpoint image encoding unit 15 of FIG. 11, and generates the multi-viewpoint corrected color image and the multi-viewpoint parallax related image. The multi-viewpoint image decoding unit 81 provides the multi-viewpoint corrected color images and the multi-viewpoint parallax related image to the viewpoint compositing unit 82.

The viewpoint compositing unit 82 uses the viewpoint generation information provided by the multi-viewpoint image decoding unit 81 to perform warping processing on the multi-viewpoint parallax related image provided by the multi-viewpoint image decoding unit 81 to warp the image according to the display viewpoints. More specifically, the viewpoint compositing unit 82 performs warping processing on the multi-viewpoint parallax related image to warp the image according to the display viewpoints with the accuracy corresponding to the parallax accuracy parameter, on the basis of the inter-camera distance, the parallax related maximum value, the parallax related minimum value, and the like included in the viewpoint generation information. The viewpoint compositing unit 82 uses the parallax related image of display viewpoints obtained as a result of warping processing to perform warping processing on the multi-viewpoint corrected color images provided by the multi-viewpoint image decoding unit 81 to warp them according to the display viewpoints. The viewpoint compositing unit 82 provides the color images for the display viewpoints obtained as a result, to the multi-viewpoint image display unit 33 as the multi-viewpoint composed color images.

As described above, the viewpoint compositing unit 82 performs warping processing on the multi-viewpoint parallax related images to warp them according to the display viewpoints with the accuracy corresponding to the viewpoint accuracy parameter on the basis of the parallax accuracy parameter, and therefore, it is not necessary for the viewpoint compositing unit 82 to wastefully perform the warping processing with a high degree of accuracy.

In addition, the viewpoint compositing unit 82 performs warping processing on the multi-viewpoint parallax related image to warp it according to the inter-camera distance, and therefore, when the parallax corresponding to the parallax related value of the multi-viewpoint parallax related image having been subjected to the warping processing is not in an appropriate range, the parallax related value can be corrected to a value corresponding to the parallax in the appropriate range on the basis of the inter-camera distance.

[Example of Configuration of Multi-Viewpoint Image Decoding Unit]

Figure 23:
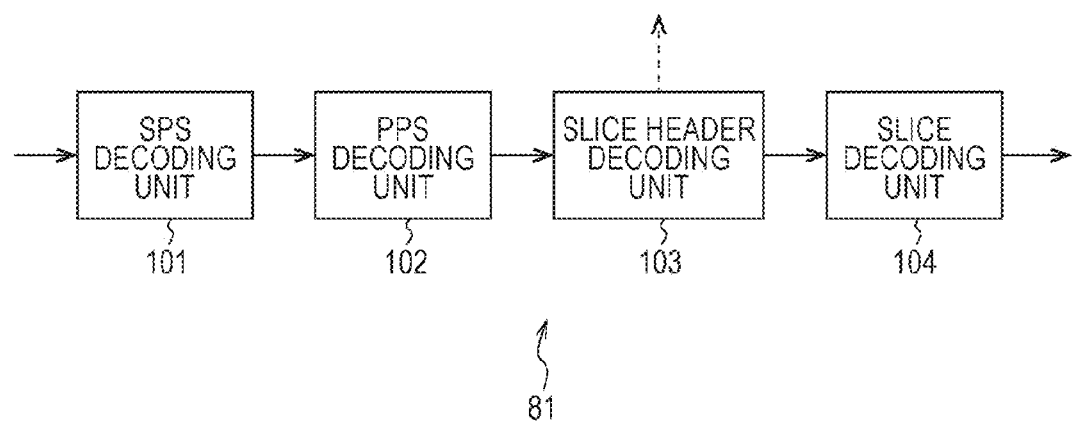
FIG. 23 is a block diagram illustrating an example of configuration of the multi-viewpoint image decoding unit of FIG. 22.

FIG. 23 is a block diagram illustrating an example of configuration of the multi-viewpoint image decoding unit 81 of FIG. 22.

The multi-viewpoint image decoding unit 81 of FIG. 23 includes an SPS decoding unit 101, a PPS decoding unit 102, a slice header decoding unit 103, and a slice decoding unit 104.

The SPS decoding unit 101 of the multi-viewpoint image decoding unit 81 receives the encoded bit stream transmitted from the encoding device 50 of FIG. 11, and extracts the SPS in the encoded bit stream. The SPS decoding unit 101 provides the PPS decoding unit 102 with the encoded bit stream other than the SPS and the extracted SPS.

The PPS decoding unit 102 extracts PPS from the encoded bit stream other than the SPS provided from the SPS decoding unit 101. The PPS decoding unit 102 provides the slice header decoding unit 103 with the encoded bit stream other than the SPS and the PPS, and the PPS and the SPS extracted.

The slice header decoding unit 103 extracts a slice header from the encoded bit stream other than the SPS and the PPS provided from the PPS decoding unit 102. When the transmission flag included in the PPS provided by the PPS decoding unit 102 is "1" indicating presence of transmission, the slice header decoding unit 103 holds the inter-camera distance, the parallax related maximum value, and the parallax related minimum value included in the slice header, or updates the inter-camera distance, the parallax related maximum value, and the parallax related minimum value held therein on the basis of the difference-encoded result of the inter-camera distance, the parallax related maximum value, and the parallax related minimum value. The slice header decoding unit 103 generates viewpoint generation information from the inter-camera distance, the parallax related maximum value, and the parallax related minimum value, which are held, and the parallax accuracy parameter included in the PPS, and provides it to the viewpoint compositing unit 82. Further, the slice header decoding unit 103 provides the slice decoding unit 104 with the encoded data in units of slices which is the encoded bit stream other than the SPS, the PPS, and the slice header, and the SPS, the PPS, and the slice header.

The slice decoding unit 104 decodes the encoded data in units of slices in accordance with the method corresponding to the encoding method of the slice encoding unit 61 (FIG. 15) on the basis of the SPS, the PPS, and the slice header provided from the slice header decoding unit 103. The slice header decoding unit 103 provides the viewpoint compositing unit 82 of FIG. 22 with the multi-viewpoint corrected color image and the multi-viewpoint parallax related image obtained as a result of decoding.

[Explanation About Processing of Decoding Device]

The decoding processing of the decoding device 80 of FIG. 22 is done in the same manner except the multi-viewpoint decoding processing in step S52 of FIG. 9, and therefore, in the explanation below, only the multi-viewpoint decoding processing will be explained.

Figure 24:
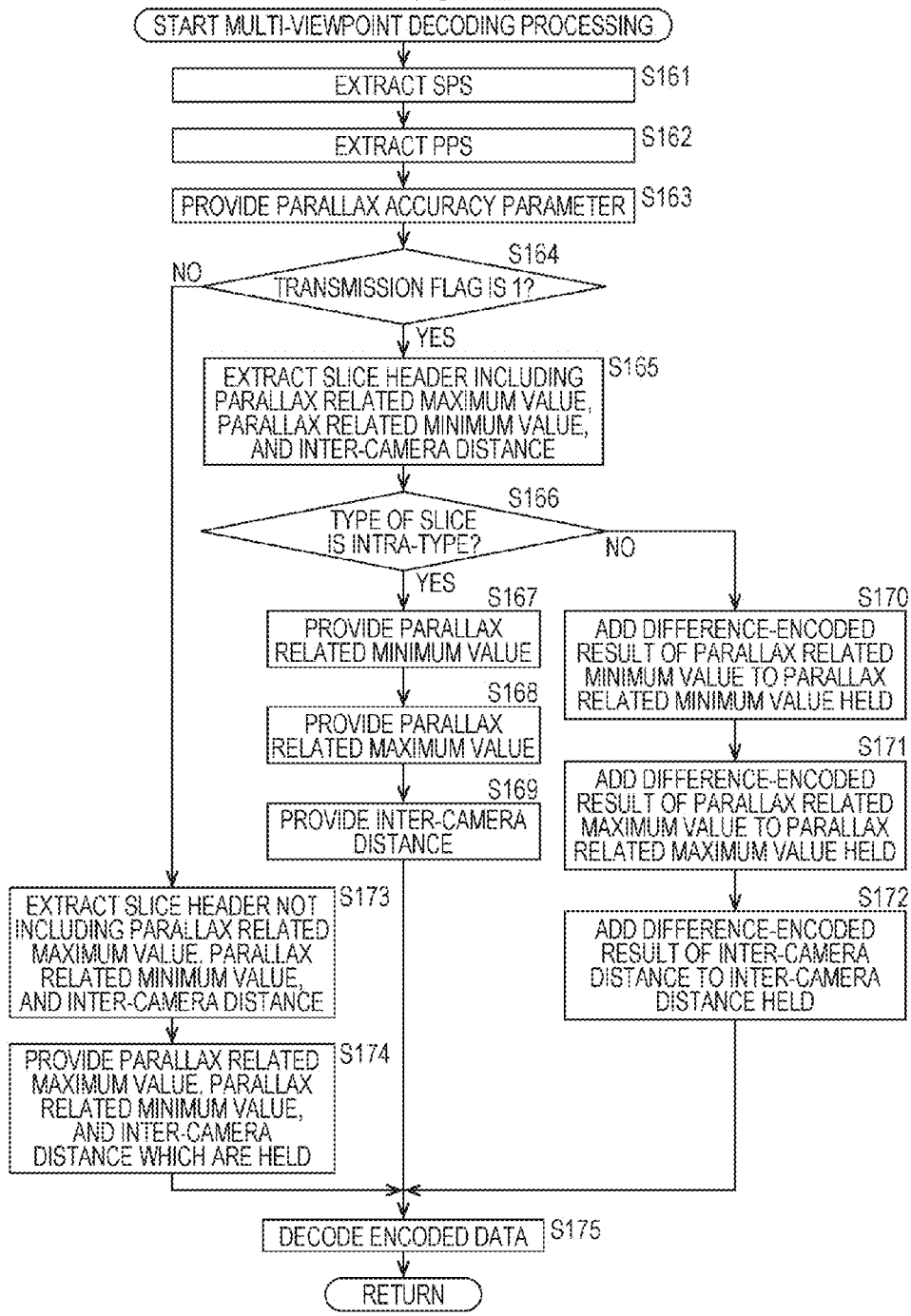
FIG. 24 is a flowchart explaining the multi-viewpoint decoding processing of the multi-viewpoint image decoding unit of FIG. 22.

FIG. 24 is a flowchart explaining the multi-viewpoint decoding processing of the multi-viewpoint image decoding unit 81 of the decoding device 80 of FIG. 22.

In step S161 of FIG. 24, the SPS decoding unit 101 of the multi-viewpoint image decoding unit 81 (FIG. 23) extracts the SPS from the received encoded bit stream. The SPS decoding unit 101 provides the PPS decoding unit 102 with the encoded bit stream other than the SPS and the extracted SPS.

In step S162, the PPS decoding unit 102 extracts PPS from the encoded bit stream other than the SPS provided from the SPS decoding unit 101. The PPS decoding unit 102 provides the slice header decoding unit 103 with the encoded bit stream other than the SPS and the PPS, and the PPS and the SPS extracted.

In step S163, the slice header decoding unit 103 provides the parallax accuracy parameter included in the PPS provided from the PPS decoding unit 102 to the viewpoint compositing unit 82 as a portion of the viewpoint generation information.

In step S164, the slice header decoding unit 103 determines whether the transmission flag included in the PPS provided by the PPS decoding unit 102 is "1" indicating presence of transmission. It should be noted that the subsequent processing in steps S165 to S174 is done in units of slices.

When the transmission flag is determined to be "1" indicating presence of transmission in step S164, the processing in step S165 is subsequently performed. In step S165, the slice header decoding unit 103 extracts the slice header including the parallax related maximum value, the parallax related minimum value, and the inter-camera distance, or the difference-encoded result of the parallax related maximum value, the parallax related minimum value, and the inter-camera distance, from the encoded bit stream other than the SPS and the PPS provided from the PPS decoding unit 102.

In step S166, the slice header decoding unit 103 determines whether the type of the slice is intra-type or not. When the type of the slice is determined to be the intra-type in step S166, the processing in step S167 is subsequently performed.

In step S167, the slice header decoding unit 103 holds the parallax related minimum value included in the slice header extracted in step S165, and provides it to the viewpoint compositing unit 82 as a portion of the viewpoint generation information.

In step S168, the slice header decoding unit 103 holds the parallax related maximum value included in the slice header extracted in step S165, and provides it to the viewpoint compositing unit 82 as a portion of the viewpoint generation information.

In step S169, the slice header decoding unit 103 holds the inter-camera distance included in the slice header extracted in step S165, and provides it to the viewpoint compositing unit 82 as a portion of the viewpoint generation information. Then, the processing in step S175 is performed.

On the other hand, when the type of the slice is determined not to be the intra-type in step S166, more specifically, when the type of the slice is determined to be the inter-type, the processing in step S170 is performed.

In step S170, the slice header decoding unit 103 adds the difference-encoded result of the parallax related minimum value included in the slice header extracted in step S165 to the held parallax related minimum value. The slice header decoding unit 103 provides the parallax related minimum value restored by adding operation to the viewpoint compositing unit 82 as a part of the viewpoint generation information.

In step S171, the slice header decoding unit 103 adds the difference-encoded result of the parallax related maximum value included in the slice header extracted in step S165 to the held parallax related maximum value. The slice header decoding unit 103 provides the parallax related maximum value restored by adding operation to the viewpoint compositing unit 82 as a part of the viewpoint generation information.

In step S172, the slice header decoding unit 103 adds the difference-encoded result of the inter-camera distance included in the slice header extracted in step S165 to the held inter-camera distance. The slice header decoding unit 103 provides the inter-camera distance restored by adding operation to the viewpoint compositing unit 82 as a part of the viewpoint generation information. Then, the processing in step S175 is performed.

When the transmission flag is determined not to be "1" indicating presence of transmission in step S164, i.e., the transmission flag is determined to be "0" indicating absence of transmission, the processing in step S173 is subsequently performed.

In step S173, the slice header decoding unit 103 extracts the slice header not including the parallax related maximum value, the parallax related minimum value, and the inter-camera distance, and the difference-encoded result of the parallax related maximum value, the parallax related minimum value, and the inter-camera distance, from the encoded bit stream other than the SPS and the PPS provided from the PPS decoding unit 102.

In step S174, the slice header decoding unit 103 determines that the parallax related maximum value, the parallax related minimum value, and the inter-camera distance which are held, i.e., the parallax related maximum value, the parallax related minimum value, and the inter-camera distance of the previous slice in the order of encoding, are the parallax related maximum value, the parallax related minimum value, and the inter-camera distance of the slice of the processing target, whereby the parallax related maximum value, the parallax related minimum value, and the inter-camera distance of the slice of the processing target are restored. Then, the slice header decoding unit 103 provides the parallax related maximum value, the parallax related minimum value, and the inter-camera distance thus restored to the viewpoint compositing unit 82 as a portion of the viewpoint generation information, and proceeds to the processing in step S175.

In step S175, the slice decoding unit 104 decodes the encoded data in units of slices in accordance with the method corresponding to the encoding method of the slice encoding unit 61 (FIG. 15) on the basis of the SPS, the PPS, and the slice header provided from the slice header decoding unit 103. The slice header decoding unit 103 provides the viewpoint compositing unit 82 of FIG. 22 with the multi-viewpoint corrected color image and the multi-viewpoint parallax related image obtained as a result of decoding.

As described above, the decoding device 80 can decode the encoded bit stream in which the parallax related maximum value, the parallax related minimum value, and the inter-camera distance are arranged as the information about encoding in the slice header. Accordingly, for example, the encoded bit stream in which the parallax related maximum value, the parallax related minimum value, and the inter-camera distance are used for encoding can be decoded.

In the second embodiment, the parallax related maximum value, the parallax related minimum value, and the inter-camera distance in the viewpoint generation information are included in the slice header, but may be described in SPS, PPS, SEI, and the like. In the second embodiment, the viewpoint generation information may also include the color image identification information, the parallax related image identification information, the external parameter information, the internal parameter information, the number of viewpoints of color images, information for identifying color images of viewpoints adopted as a base point for obtaining the parallax value, the number of viewpoints of parallax related image, the image type information, and the like.

Third Embodiment

[Explanation About Computer to Which the Present Technique is Applied]

Subsequently, the above series of processing may be performed by either hardware or software. When the series of processing is performed by software, a program constituting the software is installed in a general-purpose computer and the like.

Figure 26:
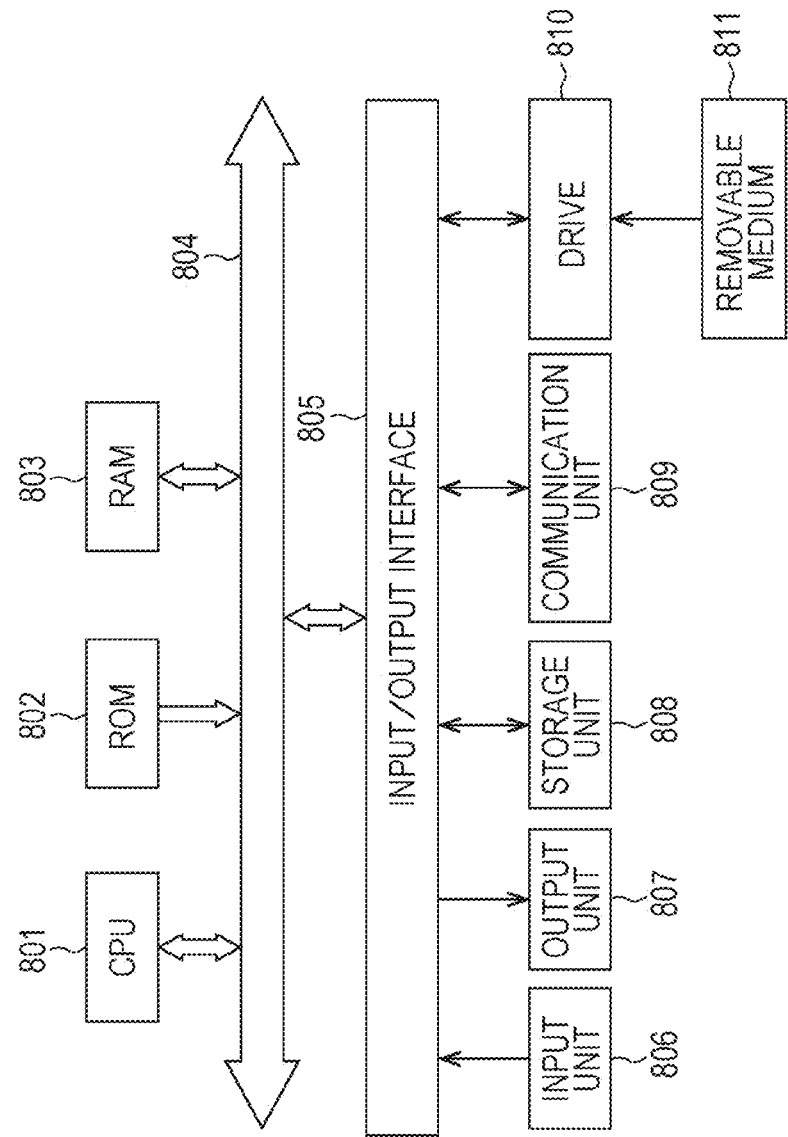
FIG. 26 is a block diagram illustrating an example of configuration of an embodiment of a computer.

FIG. 26 is an exemplary configuration of an embodiment of a computer to which the program for executing the above series of processing is installed.

The program may be previously stored in a storage unit 808 and a ROM (Read Only Memory) 802 serving as recording media incorporated into the computer.

Alternatively, the program may be stored (recorded) to a removable medium 811. This removable medium 811 may be provided as so-called package software. In this case, examples of the removable medium 811 include, for example, a flexible disk, a CD-ROM (Compact Disc Read Only Memory), a MO (Magneto Optical) disk, a DVD (Digital Versatile Disc), a magnetic disk, a semiconductor memory, and the like.

The program can be installed to the computer from the removable medium 811 as described above using a drive 810. Alternatively, the program may be downloaded to the computer via a communication network or a broadcast network, and the program can be installed to the storage unit 808 provided therein. More specifically, the program can be, for example, transferred from a download site to the computer wirelessly via a man-made satellite for digital satellite broadcasting, or may be transferred to the computer via the wire, i.e., network such as a LAN (Local Area Network) and the Internet.

The computer has a CPU (Central Processing Unit) 801. The CPU 801 is connected to an input/output interface 805 via a bus 804.

When a user operates an input unit 806 to input a command to the CPU 801 via the input/output interface 805, the CPU 801 executes the program stored in the ROM 802 in response to the command. Alternatively, the CPU 801 loads the program stored in the storage unit 808 to a RAM (Random Access Memory) 803, and executes the program.

Thus, the CPU 801 performs the processing according to the above flowcharts or the processing performed with the configurations in the block diagrams as described above. Then, as necessary, the CPU 801 outputs the processing result thereof from an output unit 807 via the input/output interface 805, transmits the processing result thereof from the communication unit 809, or records the processing result thereof to the storage unit 808, for example.

The input unit 806 is constituted by a keyboard, a mouse, a microphone, and the like. The output unit 807 is constituted by an LCD (Liquid Crystal Display), a speaker, and the like.

In this case, in this specification, the processing performed according to the program by the computer may not be necessarily performed in time-series according to the order described in the flowcharts. In other words, the processing performed according to the program by the computer include processing executed independently or in parallel (for example, processing performed with objects or parallel processing).

The program may be processed by one computer (processor), or may be processed by a plurality of computers as distributed processing. Further, the program may be transferred to a computer located far away and may be executed.

The present technique can be applied to an image processing apparatus used for communication via a network medium such as satellite broadcast, cable TV (television), the Internet, and portable telephone, or for processing on recording media such as optical, magnetic disks, and flash memories.

The above-explained image processing apparatus can be applied to any given electronic device. Hereinafter, an example thereof will be explained.

Fourth Embodiment

[Example of Configuration of Television Device]

Figure 27:
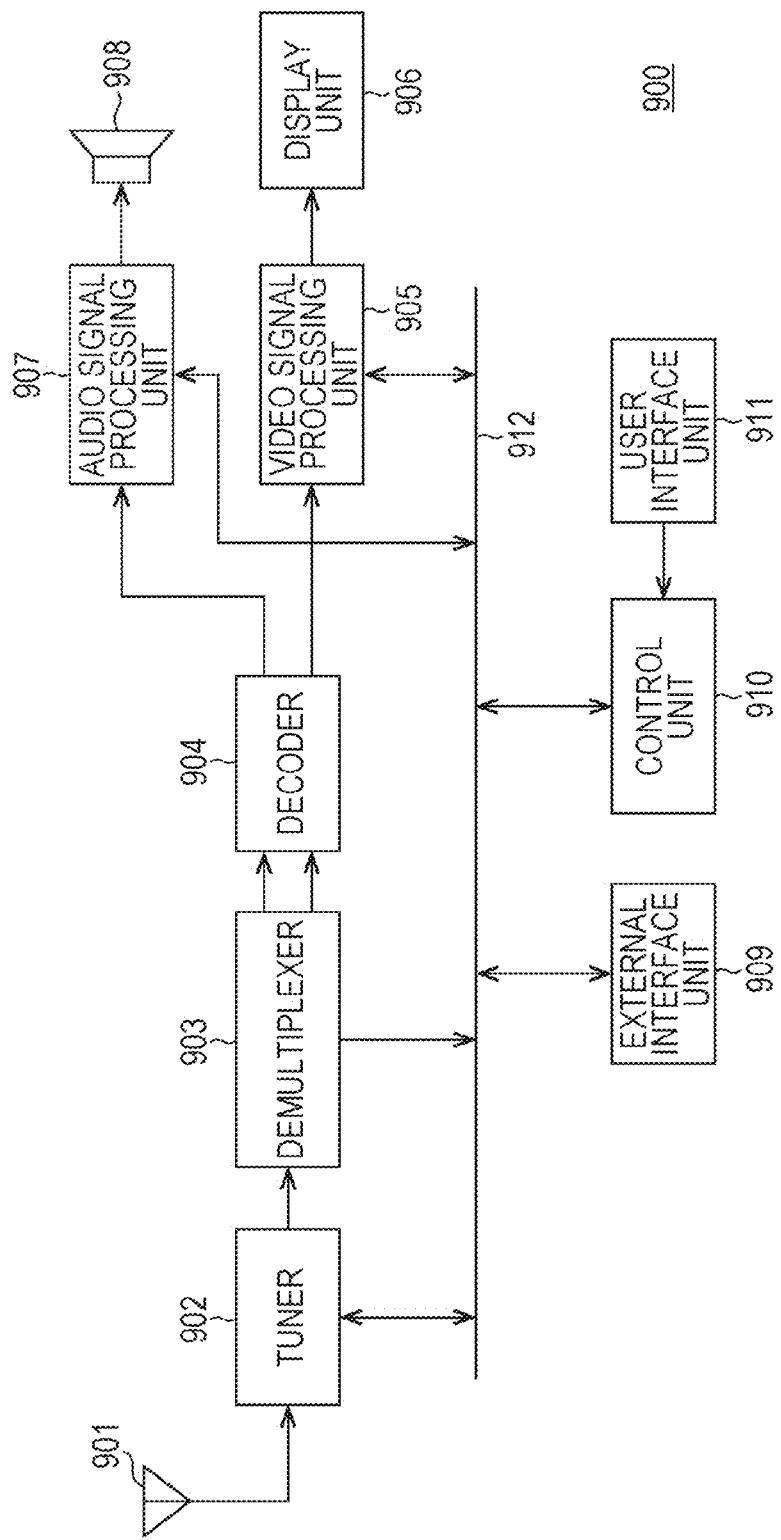
FIG. 27 is a figure illustrating an example of schematic configuration of a television device to which the present technique is applied.

FIG. 27 illustrates an example of schematic configuration of television device to which the present technique is applied. The television device 900 includes an antenna 901, a tuner 902, a demultiplexer 903, a decoder 904, a video signal processing unit 905, a display unit 906, an audio signal processing unit 907, a speaker 908, and an external interface unit 909. Further, the television device 900 includes a control unit 910 and a user interface unit 911.

The tuner 902 tunes into and decodes a desired channel from among broadcast signals received by the antenna 901, and outputs the encoded bit stream thus obtained to the demultiplexer 903.

The demultiplexer 903 extracts packets of video and audio of a program, which is a viewing target, from the encoded bit stream, and outputs the data of the extracted packets to the decoder 904. The demultiplexer 903 also provides packets of data such as EPG (Electronic Program Guide) to the control unit 910. When scrambled, the demultiplexer and the like performs descrambling.

The decoder 904 performs decoding processing of packets, and outputs the video data generated by the decoding processing to the video signal processing unit 905, and the audio data to the audio signal processing unit 907.

The video signal processing unit 905 performs noise reduction and video processing according to user settings on the video data. The video signal processing unit 905 generates, e.g., video data of a program displayed on the display unit 906 and image data made by processing based on an application provided via a network. The video signal processing unit 905 generates video data for displaying a menu screen and the like for allowing selection of items, and overlays the video data on the video data of the program. The video signal processing unit 905 generates a driving signal on the basis of the video data thus generated, and drives the display unit 906.

The display unit 906 displays, e.g., video of program, by driving a display device (for example, liquid crystal display device and the like) on the basis of the driving signal provided by the video signal processing unit 905.

The audio signal processing unit 907 performs predetermined processing such as noise reduction on the audio data, and D/A conversion processing and amplification processing of the audio data having been processed, and provides the data to the speaker 908, thus outputting audio.

The external interface unit 909 is an interface for connecting an external device and a network, and exchange data such as video data and audio data.

The control unit 910 is connected to the user interface unit 911. The user interface unit 911 is constituted by, e.g., operation switches and a remote control signal reception unit, and provides an operation signal according to user operation to the control unit 910.

The control unit 910 is constituted by a CPU (Central Processing Unit), a memory, and the like. The memory stores, e.g., programs executed by the CPU, various kinds of data required when processing is performed with the CPU, EPG data, and data obtained via a network. The programs stored in the memory is read and executed by the CPU with predetermined timing such as during activation of the television device 900. The CPU executes the program, thus controlling each unit so as to cause the television device 900 to operate in accordance with user operation.

The television device 900 is provided with the bus 912 for connecting the tuner 902, the demultiplexer 903, the decoder 904, the video signal processing unit 905, the audio signal processing unit 907, the external interface unit 909, and the control unit 910.

In the television device configured as described above, the decoder 904 is provided with a function of an image processing apparatus (image processing method) of the present application. Accordingly, using the color image of the predetermined viewpoint and the parallax related image, a color image of a viewpoint other than the predetermined viewpoint can be generated.

Fifth Embodiment

[Example of Configuration of Portable Telephone]

Figure 28:
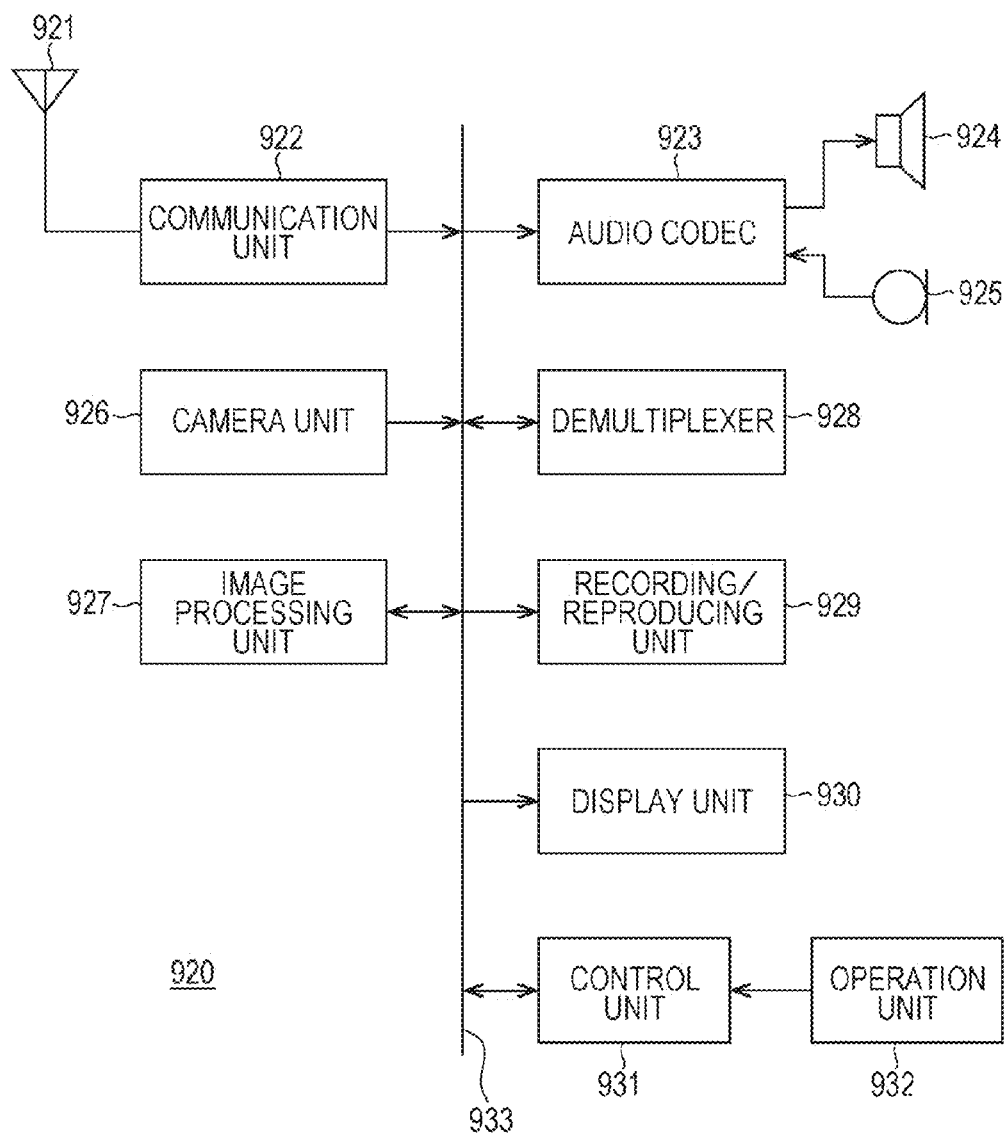
FIG. 28 is a figure illustrating an example of schematic configuration of a portable telephone to which the present technique is applied.

FIG. 28 illustrates an example of schematic configuration of portable telephone to which the present technique is applied. A portable telephone 920 includes a communication unit 922, an audio codec 923, a camera unit 926, an image processing unit 927, a demultiplexer 928, a recording/reproducing unit 929, a display unit 930, and a control unit 931. They are connected with each other via a bus 933.

The communication unit 922 is connected to the antenna 921, and the audio codec 923 is connected to the speaker 924 and the microphone 925. Further, the control unit 931 is connected to the operation unit 932.

The portable telephone 920 performs various kinds of operation such as transmission and reception of audio signal, transmission and reception of e-mail and image data, image capturing, or recording of data, in various kinds of modes such as audio phone call mode and data communication mode.

In the audio phone call mode, an analog audio signal generated by the microphone 925 is, e.g., converted into audio data and compressed by the audio codec 923, and is provided to the communication unit 922. The communication unit 922 performs, e.g., modulation processing and frequency conversion processing on the audio data, and generates a transmission signal. The communication unit 922 provides the transmission signal to the antenna 921, and transmits the transmission signal to a base station, not shown. The communication unit 922 performs, e.g., amplification, frequency conversion processing and amplification processing on the reception signal received by the antenna 921, and provides the obtained audio data to the audio codec 923. The audio codec 923 performs, e.g., data extension of the audio data and conversion into analog audio signal, and outputs the data to the speaker 924.

When mail is transmitted in the data communication mode, the control unit 931 receives character data which are input by operation with the operation unit 932, and displays the input characters on the display unit 930. The control unit 931 also generates mail data on the basis of, e.g., user instruction with the operation unit 932, and provides the mail data to the communication unit 922. The communication unit 922 performs, e.g., modulation processing and frequency conversion processing on mail data, and transmits the obtained transmission signal via the antenna 921. The communication unit 922 performs, e.g., amplification, frequency conversion processing and amplification processing on the reception signal received by the antenna 921, and restores the mail data. The mail data are provided to the display unit 930, and the contents of the mail are displayed.

The portable telephone 920 can also store the received mail data to a storage medium using the recording/reproducing unit 929. The storage medium any given rewritable storage medium. For example, the storage medium may be a semiconductor memory such as RAM and internal flash memory, a hard disk, or a removable medium such as a magnetic disk, a magneto optical disk, an optical disk, a USB memory, or a memory card.

When image data are transmitted in the data communication mode, the image data generated by the camera unit 926 are provided to the image processing unit 927. The image processing unit 927 performs encoding processing of the image data and generates encoded data.

The demultiplexer 928 multiplexes the encoded data generated by the image processing unit 927 and the audio data provided from the audio codec 923 in accordance with predetermined method, and provides the data to the communication unit 922. The communication unit 922 performs, e.g., modulation processing and frequency conversion processing on the multiplexed data, and transmits the obtained transmission signal via the antenna 921. The communication unit 922 performs, e.g., amplification, frequency conversion processing and amplification processing on the reception signal received by the antenna 921, and restores the multiplexed data. The multiplexed data are provided to the demultiplexer 928. The demultiplexer 928 separates the multiplexed data, and provides the encoded data to the image processing unit 927, and the audio data to the audio codec 923. The image processing unit 927 performs decoding processing of the encoded data and generates image data. The image data are provided to the display unit 930, and the received image is displayed. The audio codec 923 converts the audio data into analog audio signal, and provides the analog audio signal to the speaker 924 so as to output the received audio.

In the portable telephone configured as described above, the image processing unit 927 is provided with a function of an image processing apparatus (image processing method) of the present application. Accordingly, using the color image of the predetermined viewpoint and the parallax related image, information required to generate a color image of a viewpoint other than the predetermined viewpoint can be transmitted. Using the color image of the predetermined viewpoint and the parallax related image, a color image of a viewpoint other than the predetermined viewpoint can be generated.

Sixth Embodiment

[Example of Configuration of Recording/Reproducing Device]

Figure 29:
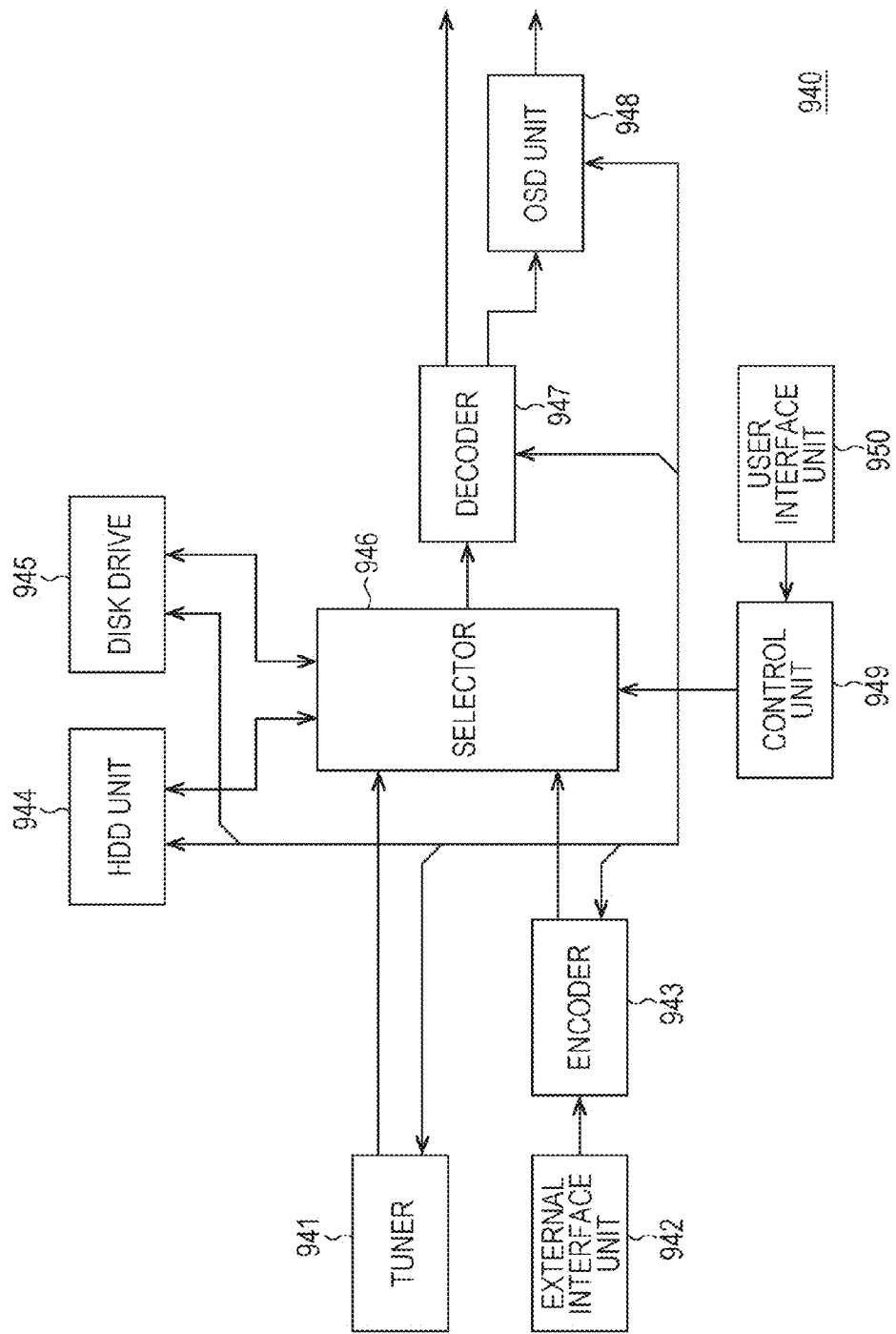
FIG. 29 is a figure illustrating an example of schematic configuration of a recording/reproducing device to which the present technique is applied.

FIG. 29 illustrates an example of schematic configuration of recording/reproducing device to which the present technique is applied. For example, a recording/reproducing device 940 records audio data and video data of received broadcasting program to a recording medium, and provides a user with the recorded data with timing according to user's instruction. For example, the recording/reproducing device 940 can obtain the audio data and the video data from another device, and can record them to the recording medium. Further, the recording/reproducing device 940 decodes and outputs the audio data and the video data recorded in the recording medium, thus allowing image display and audio output with the monitor device and the like.

The recording/reproducing device 940 includes a tuner 941, an external interface unit 942, an encoder 943, an HDD (Hard Disk Drive) unit 944, a disk drive 945, a selector 946, a decoder 947, an OSD (On-Screen Display) unit 948, a control unit 949, and a user interface unit 950.

The tuner 941 tunes in to a desired channel from broadcasting signals received by an antenna, not shown. The tuner 941 outputs, to the selector 946, an encoded bit stream obtained by amplifying the reception signal of the desired channel.

The external interface unit 942 may be constituted by, for example, any one of an IEEE1394 interface, a network interface unit, a USB interface, a flash memory interface, and the like. The external interface unit 942 is an interface for connecting to an external device, a network, a memory card, and the like, and receives data such as the video data, the audio data, and the like thus recorded.

The encoder 943 performs encoding according to a predetermined method when the video data and the audio data provided from the external interface unit 942 are not encoded, and outputs the encoded bit stream to the selector 946.

The HDD unit 944 records the content data such as video and audio, other data of various kinds of programs, and the like to an internal hard disk, and reads them from the hard disk during play back and the like.

The disk drive 945 records and reproduces the signal to/from an optical disk loaded. For example, the optical disk is a DVD disk (DVD-Video, DVD-RAM, DVD-R, DVD-RW, DVD+R, DVD+RW and the like), a Blu-ray disk, and the like.

During recording of video and audio, the selector 946 selects an encoded bit stream from any one of the tuner 941 and the encoder 943, and provides it to any one of the HDD unit 944 and the disk drive 945. During reproduction of video and audio, the selector 946 provides the decoder 947 with the encoded bit stream which is output from the HDD unit 944 or the disk drive 945.

The decoder 947 performs decoding processing of the encoded bit stream. The decoder 947 performs decoding processing, thereby providing the generated video data to the OSD unit 948. The decoder 947 performs decoding processing, thereby outputting the generated audio data.

The OSD unit 948 generates video data for displaying menu screen and the like such as item selection, and overlays and outputs them on the video data which are output from the decoder 947.

The control unit 949 is connected to the user interface unit 950. The user interface unit 950 is constituted by, e.g., operation switches and a remote control signal reception unit, and provides an operation signal according to user operation to the control unit 949.

The control unit 949 is constituted by a CPU, a memory, and the like. The memory stores, e.g., programs executed by the CPU, various kinds of data required when processing is performed with the CPU. The programs stored in the memory is read and executed by the CPU with predetermined timing such as during activation of the recording/reproducing device 940. The CPU executes the program, thus controlling each unit so as to cause the recording/reproducing device 940 to operate in accordance with user operation.

In the recording/reproducing device configured as described above, the decoder 947 is provided with a function of an image processing apparatus (image processing method) of the present application. Accordingly, using the color image of the predetermined viewpoint and the parallax related image, a color image of a viewpoint other than the predetermined viewpoint can be generated.

Seventh Embodiment

[Example of Configuration of Image-Capturing Device]

Figure 30:
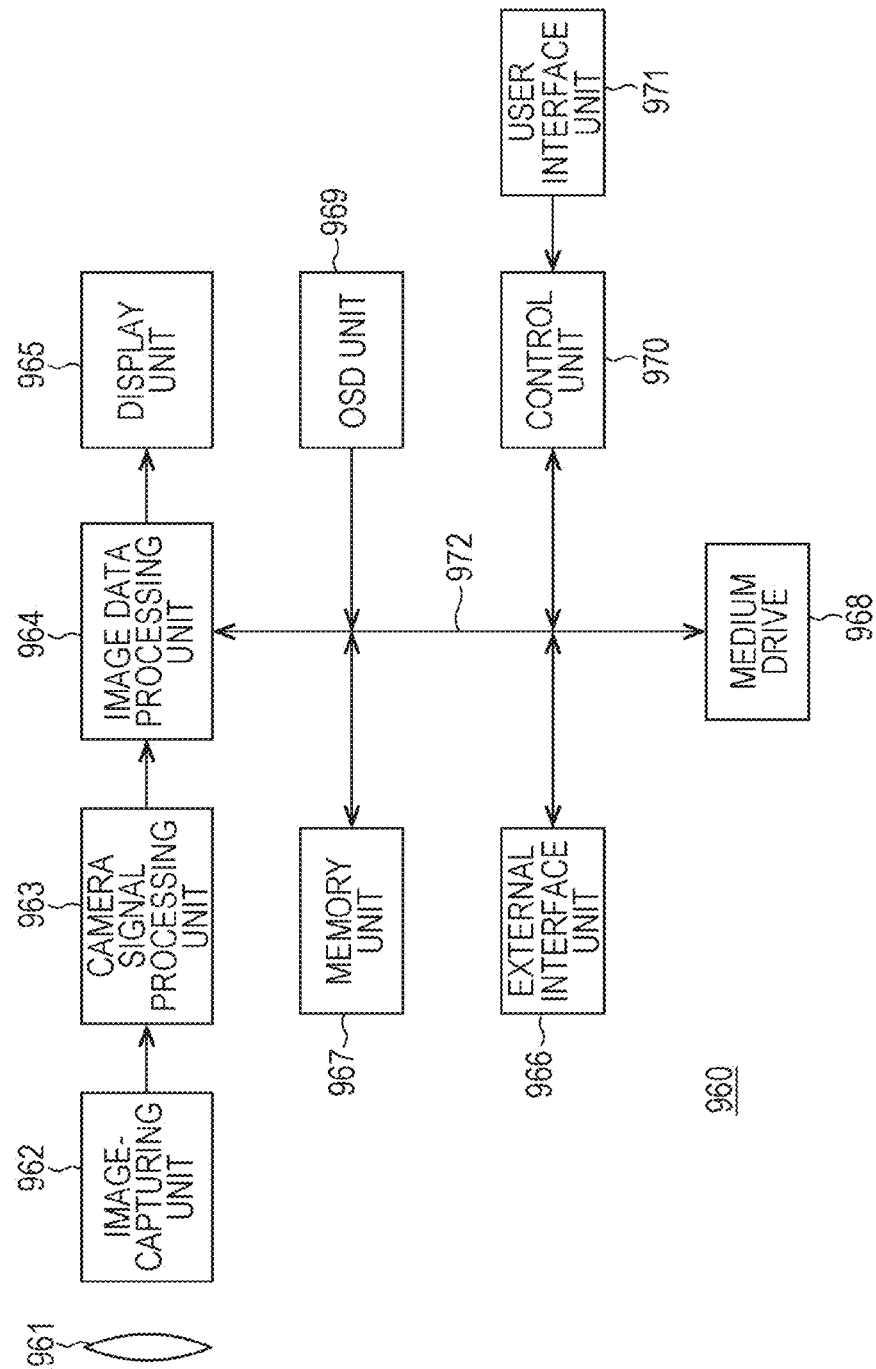
FIG. 30 is a figure illustrating an example of schematic configuration of an image-capturing device to which the present technique is applied.

FIG. 30 illustrates an example of schematic configuration of image-capturing device to which the present technique is applied. An image-capturing device 960 captures an image of a subject, displays the image of the subject on the display unit, and records the image data to a recording medium.

The image-capturing device 960 includes an optical block 961, an image-capturing unit 962, a camera signal processing unit 963, an image data processing unit 964, a display unit 965, an external interface unit 966, a memory unit 967, a medium drive 968, an OSD unit 969, and a control unit 970. The control unit 970 is connected to a user interface unit 971. Further, the image data processing unit 964, the external interface unit 966, the memory unit 967, the medium drive 968, the OSD unit 969, the control unit 970, and the like are connected via the bus 972.

The optical block 961 includes, e.g., a focus lens and a diaphragm mechanism. The optical block 961 causes an optical image of a subject to be formed on an image-capturing surface of the image-capturing unit 962. The image-capturing unit 962 includes a CCD or a CMOS image sensor, and generates an electric signal according to an optical image by photoelectric conversion, and provides the electric signal to the camera signal processing unit 963.

The signal processing unit 963 performs various kinds of camera signal processing such as knee correction, gamma correction, and color correction on the electric signal provided by the image-capturing unit 962. The camera signal processing unit 963 provides the image data processing unit 964 with image data having been subjected to the camera signal processing.

The image data processing unit 964 performs encoding processing on the image data provided from the camera signal processing unit 963. The image data processing unit 964 the external interface unit 966 and the medium drive 968 with the encoded data generated by performing the encoding processing. The image data processing unit 964 performs decoding processing on the encoded data provided by the external interface unit 966 and the medium drive 968. The image data processing unit 964 provides the display unit 965 with the image data generated by performing the decoding processing. The image data processing unit 964 performs processing for providing the display unit 965 with the image data provided from the camera signal processing unit 963, and overlays the display data obtained from the OSD unit 969 on the image data and provides the data to the display unit 965.

The OSD unit 969 generates display data such as menu screen and icons including symbols, characters, or figures, and outputs the display data to the image data processing unit 964.

The external interface unit 966 is constituted by, for example, a USB input/output terminal, and when image is printed, it is connected to a printer. The external interface unit 966 is also connected to a drive as necessary, and removable medium such as a magnetic disk, an optical disk, or the like is loaded as necessary, and a computer program read therefrom is installed as necessary. Further, the external interface unit 966 includes a network interface connected to a predetermined network such as a LAN or the Internet. For example, the control unit 970 reads the encoded data from the memory unit 967 in accordance with a command from the user interface unit 971, and can provide the data to another device connected via the network from the external interface unit 966. The control unit 970 obtains, via external interface unit 966, the encoded data and the image data provided from another device via the network, and can provided the data to the image data processing unit 964, for example.

The recording medium driven the medium drive 968 may be any given removable medium which can be read and written, such as a magnetic disk, an optical magnetic disk, an optical disk, or a semiconductor memory. The recording medium may be of any type as a removable medium, and may be a tape device, or a disk, or a memory card. It is to be understood that it may be a non-contact IC card and the like.

The medium drive 968 and the recording medium may be integrated, and like, for example, an internal hard disk drive and an SSD (Solid State Drive), the medium drive 968 and the recording medium may be configured by a non-movable storage medium.

The control unit 970 is constituted by a CPU, a memory, and the like. The memory stores, e.g., programs executed by the CPU, various kinds of data required when processing is performed with the CPU. The programs stored in the memory is read and executed by the CPU with predetermined timing such as during activation of the image-capturing device 960. The CPU executes the program, thus controlling each unit so as to cause the image-capturing device 960 to operate in accordance with user operation.

In the image-capturing device configured as described above, the image data processing unit 964 is provided with a function of an image processing apparatus (image processing method) of the present application. Accordingly, using the color image of the predetermined viewpoint and the parallax related image, information required to generate a color image of a viewpoint other than the predetermined viewpoint can be transmitted. Using the color image of the predetermined viewpoint and the parallax related image, a color image of a viewpoint other than the predetermined viewpoint can be generated.

More specifically, the embodiments of the present technique is not limited to the embodiments explained above, and may be changed in various manners as long as it is within the gist of the present technique.

It should be noted that the present technique may be configured as follows.

(1)

An image processing apparatus including an encoding unit for generating a bit stream by encoding a color image of a viewpoint and a depth image of the viewpoint; a generation unit for generating viewpoint generation information used to generate a color image of a display viewpoint, in accordance with a generation method of the color image of the display viewpoint obtained by performing warping processing using the color image and the depth image; and a transmission unit for transmitting the bit stream generated by the encoding unit and the viewpoint generation information generated by the generation unit.

(2)

The image processing apparatus as described in (1), wherein the transmission unit transmits the viewpoint generation information as an encoding parameter used for encoding or decoding.

(3)

The image processing apparatus as described in (1) or (2), wherein the transmission unit transmits difference between the viewpoint generation information of the depth image and the viewpoint generation information of a depth image located before the depth image in the order of encoding.

(4)

The image processing apparatus as described in (3), wherein when the slice of the bit stream is intra-slice, the transmission unit transmits the viewpoint generation information of the slice, and when the slice is inter-slice, the transmission unit transmits the difference of the slice.

(5)

The image processing apparatus as described in (3) or (4) further includes a setting unit for setting difference identification information for identifying presence/absence of the difference, wherein the transmission unit transmits the difference identification information which is set by the setting unit.

(6)
The image processing apparatus as described in (5), wherein the transmission unit transmits the difference identification information set by the setting unit in such a manner that the difference identification information is included in the PPS (Picture Parameter Set) of the bit stream.

(7)
The image processing apparatus as described in any one of (1) to (6), wherein the generation unit generates, as the viewpoint generation information, information for identifying the color image or information for identifying the depth image.

(8)
The image processing apparatus as described in any one of (1) to (7), wherein the depth image is a depthwise image including a depth value representing a position of a subject in a depth direction at each pixel of the color image, or a parallax image including a parallax value representing a distance between each pixel of the color image and a pixel of a color image at a base point corresponding to the pixel, and the generation unit generates, as the viewpoint generation information, depth image identification information indicating whether the depth image is the depthwise image or the parallax image.

(9)
The image processing apparatus as described in (8), wherein when the depth image is the depthwise image, the generation unit generates, as the viewpoint generation information, information indicating a minimum value and a maximum value of world coordinate value at a position in the depth direction that may occur in the depth image, and when the depth image is the parallax image, the generation unit generates, as the viewpoint generation information, information indicating a minimum value and a maximum value of parallax, in world coordinate, at a position that may occur in the parallax image, and information for identifying a color image of the base point.

(10)
The image processing apparatus as described in any one of (1) to (8), wherein the generation unit generates, as the viewpoint generation information, a depth minimum value representing the minimum value that would occur as a pixel value of the depth image, a depth maximum value representing the maximum value that would occur as a pixel value of the depth image, and an image-capturing position distance which is a distance between image-capturing positions of multiple color images corresponding to the depth image, and the transmission unit transmits the viewpoint generation information as a slice header of the bit stream.

(11)
An image processing method for an image processing apparatus, including an encoding step for generating a bit stream by encoding a color image of a viewpoint and a depth image of the viewpoint, a generation step for generating viewpoint generation information used to generate a color image of a display viewpoint, in accordance with a generation method of the color image of the display viewpoint obtained by performing warping processing using the color image and the depth image, and a transmission step for transmitting the bit stream generated in the processing of the encoding step and the viewpoint generation information generated in the processing of the generation step.

(12)
An image processing apparatus including a receiving unit for receiving a bit stream obtained as a result of encoding of a color image of a viewpoint and a depth image of the viewpoint and viewpoint generation information used to generate a color image of a display viewpoint which is generated in accordance with a generation method of the color image of the display viewpoint obtained by performing warping processing using the color image and the depth image, a decoding unit for generating the color image and the depth image by decoding the bit stream received by the receiving unit, and a generation unit for generating the color image of the display viewpoint by performing warping processing using the color image and the depth image generated by the decoding unit and the viewpoint generation information received by the receiving unit.

(13)
The image processing apparatus as described in (12), wherein the receiving unit receives the viewpoint generation information as an encoding parameter used for encoding or decoding.

(14)
The image processing apparatus as described in (12) or (13), wherein the receiving unit receives difference between the viewpoint generation information of the depth image and the viewpoint generation information of a depth image located before the depth image in the order of encoding, the generation unit restores the viewpoint generation information of the depth image corresponding to the difference using the difference and the viewpoint generation information of the depth image located, in the order of encoding, before the depth image corresponding to the difference, which are received by the receiving unit, and performs warping processing using the restored viewpoint generation information, the color image, and the depth image, thus generating the color image of the display viewpoint.

(15)
The image processing apparatus as described in (14), wherein when the slice of the bit stream is intra-slice, the receiving unit receives the viewpoint generation information of the slice, and when the slice is inter-slice, the receiving unit receives the difference of the slice.

(16)
The image processing apparatus as described in (14) or (15), wherein the receiving unit receives difference identification information for identifying presence/absence of the difference, and the generation unit restores the viewpoint generation information on the basis of the difference identification information received by the receiving unit.

(17)
The image processing apparatus as described in (16), wherein the receiving unit receives the difference identification information included in the PPS (Picture Parameter Set) of the bit stream.

(18)
The image processing apparatus as described in any one of (12) to (17), wherein the receiving unit receives, as the viewpoint generation information, information for identifying the color image or information for identifying the depth image, and the generation unit identifies the color image and depth image received by the receiving unit on the basis of the viewpoint generation information, performs warping processing on the depth image, and generates the color image of the display viewpoint by performing warping processing on the color image using the depth image of the display viewpoint having been subjected to the warping processing.

(19)

The image processing apparatus as described in any one of (12) to (18), wherein the depth image is a depthwise image including a depth value representing a position of a subject in a depth direction at each pixel of the color image, or a parallax image including a parallax value representing a distance between each pixel of the color image and a pixel of a color image at a base point corresponding to the pixel, and the receiving unit receives, as the viewpoint generation information, information indicating whether the depth image is a depthwise image or a parallax image.

(20)

The image processing apparatus as described in (19), wherein when the depth image is the depthwise image, the receiving unit receives, as the viewpoint generation information, information indicating a minimum value and a maximum value of world coordinate value at a position in the depth direction that may occur in the depth image, and when the depth image is the parallax image, the receiving unit receives information indicating a minimum value and a maximum value of parallax, in world coordinate, at a position that may occur in the parallax image, and information for identifying a color image of the base point.

(21)

The image processing apparatus as described in any one of (12) to (19), wherein the receiving unit receives, as a slice header of the bit stream, the viewpoint generation information including a depth minimum value representing the minimum value that would occur as a pixel value of the depth image, a depth maximum value representing the maximum value that would occur as a pixel value of the depth image, and an image-capturing position distance which is a distance between image-capturing positions of multiple color images corresponding to the depth image.

(22)

An image processing method for an image processing apparatus, including a receiving step for receiving a bit stream obtained as a result of encoding of a color image of a viewpoint and a depth image of the viewpoint and viewpoint generation information used to generate a color image of a display viewpoint which is generated in accordance with a generation method of the color image of the display viewpoint obtained by performing warping processing using the color image and the depth image, a decoding step for generating the color image and the depth image by decoding the bit stream received in the processing of the receiving step, and a generation step for generating the color image of the display viewpoint by performing warping processing using the color image and the depth image generated in the processing of the decoding step and the viewpoint generation information received in the processing of the receiving unit.

REFERENCE SIGNS LIST

10 encoding device, 14 viewpoint generation information generation unit, 15 multi-viewpoint image encoding unit, 30 decoding device, 31 multi-viewpoint image decoding unit, 32 viewpoint compositing unit

The invention claimed is:

1. An image processing apparatus comprising:
circuitry configured to function as:
a receiving unit for receiving a bit stream obtained as a result of encoding of a first color image of a viewpoint and a depth image of the viewpoint and depth image identification information identifying the depth image as one of two different image types, the two different image types being a depthwise image and a parallax image;
a decoding unit for generating the first color image and the depth image by decoding the bit stream received by the receiving unit; and
a generation unit for generating a second color image of a display viewpoint, the second color image having a same depth as the first color image and/or as the depth image, by performing warping processing using the first color image and the depth image generated by the decoding unit and the depth image identification information received by the receiving unit, wherein:
when the depth image is the depthwise image, the receiving unit is configured to receive at least one of depthwise minimum value information indicating a minimum value of world coordinate value at a position in a depth direction in the depthwise image and depthwise maximum value information indicating a maximum value of world coordinate value at a position in the depth direction in the depthwise image, and
when the depth image is the parallax image, the receiving unit is configured to receive at least one of parallax minimum value information indicating a minimum value of a distance of world coordinate value in the parallax image and parallax maximum value information indicating a maximum value of the distance of world coordinate value in the parallax image.

2. The image processing apparatus according to claim 1, wherein the receiving unit receives the depth image identification information as auxiliary information of the bit stream.

3. The image processing apparatus according to claim 1, wherein the receiving unit receives the depth image identification information as SEI (Supplemental Enhancement Information).

4. The image processing apparatus according to claim 1, wherein
the receiving unit receives viewpoint generation information for identifying the first color image or information for identifying the depth image, and
the generation unit identifies the first color image and depth image on the basis of the viewpoint generation information, performs warping processing on the depth image, and generates the second color image of the display viewpoint by performing warping processing on the first color image using the depth image of the display viewpoint having been subjected to the warping processing.

5. The image processing apparatus according to claim 1, wherein
the receiving unit receives viewpoint generation information as SEI (Supplemental Enhancement Information),
the depth image is a parallax image including a parallax value representing a distance between each pixel of the first color image and a pixel of a color image at a base point corresponding to the pixel, and
the viewpoint generation information includes parallax minimum value information indicating a minimum value of the parallax value of the parallax image and parallax maximum value information indicating a maximum value of the parallax value of the parallax image.

6. The image processing apparatus according to claim 1, wherein
the receiving unit receives viewpoint generation information as SEI (Supplemental Enhancement Information),
the depth image is a depthwise image including a depth value representing a position of a subject in a depth direction at each pixel of the first color image, and
the viewpoint generation information includes depthwise minimum value information indicating a minimum value of a pixel value of the depth image and depthwise maximum value information indicating a maximum value of the pixel value of the depth image.

7. The image processing apparatus according to claim 1, wherein
the depth image is a depthwise image including a depth value representing a position of a subject in a depth direction at each pixel of the first color image, or a parallax image including a parallax value representing a distance between each pixel of the first color image and a pixel of a color image at a base point corresponding to the pixel.

8. The image processing apparatus according to claim 1, wherein
the receiving unit receives, as SEI (Supplemental Enhancement Information), viewpoint generation information including depth minimum value information indicating a minimum value of a pixel value in the depth image, depth maximum value information indicating a maximum value of a pixel value in the depth image, and image-capturing position distance information indicating a distance between image-capturing positions of color images corresponding to depth images.

9. An image processing method for an image processing apparatus, comprising:
a receiving step for receiving a bit stream obtained as a result of encoding of a first color image of a viewpoint and a depth image of the viewpoint and depth image identification information identifying the depth image as one of two different image types, the two different image types being a depthwise image and a parallax image;
a decoding step for generating the first color image and the depth image by decoding the bit stream received in the processing of the receiving step; and
a generation step for generating a second color image of a display viewpoint, the second color image having a same depth as the first color image and/or as the depth image, by performing warping processing using the first color image and the depth image generated in the processing of the decoding step and the depth image identification information received in the receiving step, wherein:
when the depth image is the depthwise image, the receiving unit is configured to receive at least one of depthwise minimum value information indicating a minimum value of world coordinate value at a position in a depth direction in the depthwise image and depthwise maximum value information indicating a maximum value of world coordinate value at a position in the depth direction in the depthwise image, and
when the depth image is the parallax image, the receiving unit is configured to receive at least one of parallax minimum value information indicating a minimum value of a distance of world coordinate value in the parallax image and parallax maximum value information indicating a maximum value of the distance of world coordinate value in the parallax image.

10. The image processing apparatus according to claim 1, wherein
performing the warping processing comprises using the same depth as the first color image and/or as the depth image.

11. The image processing method according to claim 9, wherein
performing the warping processing comprises using the same depth as the first color image and/or as the depth image.

12. The image processing apparatus according to claim 1, wherein
performing the warping processing comprises using the first color image and/or the depth image with unaltered depth.

13. The image processing method according to claim 9, wherein
performing the warping processing comprises using the first color image and/or the depth image with unaltered depth.

14. The image processing apparatus according to claim 1, wherein
performing the warping processing comprises maintaining the same depth as the first color image and/or the depth image.

15. The image processing method according to claim 9, wherein
performing the warping processing comprises maintaining the same depth as the first color image and/or the depth image.

* * * * *